(12) United States Patent
Alexander et al.

(10) Patent No.: US 8,998,496 B2
(45) Date of Patent: Apr. 7, 2015

(54) GEAR PUMP WITH ASYMMETRICAL DUAL BEARING

(71) Applicant: Colfax Corporation, Fulton, MD (US)

(72) Inventors: Philip T. Alexander, Matthews, NC (US); Neil V. Norton, Charlotte, NC (US); Robert Edward Oehman, Jr., Cary, NC (US); Mary B. Rollins, Sanford, NC (US); Joel E. Cate, Indian Trail, NC (US)

(73) Assignee: IMO Industries, Inc., Hamilton, NJ (US)

( * ) Notice: Subject to any disclaimer, the term of this patent is extended or adjusted under 35 U.S.C. 154(b) by 71 days.

(21) Appl. No.: 13/850,884

(22) Filed: Mar. 26, 2013

(65) Prior Publication Data

US 2013/0259729 A1    Oct. 3, 2013

Related U.S. Application Data

(60) Provisional application No. 61/618,218, filed on Mar. 30, 2012.

(51) Int. Cl.
| | |
|---|---|
| *F16C 33/10* | (2006.01) |
| *F16C 33/04* | (2006.01) |
| *F04C 15/00* | (2006.01) |
| *F01C 21/02* | (2006.01) |
| *F04C 2/18* | (2006.01) |
| *F16C 33/74* | (2006.01) |
| *F16C 17/26* | (2006.01) |

(52) U.S. Cl.
CPC .............. *F16C 33/04* (2013.01); *F04C 15/0088* (2013.01); *F01C 21/02* (2013.01); *F04C 2/18* (2013.01); *F16C 33/74* (2013.01); *F16C 17/26* (2013.01); *F16C 33/1065* (2013.01); *F04C 15/0038* (2013.01); *F04C 2240/52* (2013.01); *F04C 2240/56* (2013.01)

(58) Field of Classification Search
CPC ... F01C 21/02; F04C 2240/56; F16C 33/1065
USPC .................. 384/397–400; 418/131, 132, 135
See application file for complete search history.

(56) References Cited

U.S. PATENT DOCUMENTS 3,029,739 A * 4/1962 Nagely ........................... 418/73
3,490,382 A * 1/1970 Joyner .......................... 418/102

(Continued)

OTHER PUBLICATIONS

International Search Report and Written Opinion, mailed, Jun. 13, 2013 for PCT/US2013/034034 filed Mar. 27, 2013.

*Primary Examiner* — Phillip A Johnson
(74) *Attorney, Agent, or Firm* — Kacvinsky Daisak Bluni PLLC

(57) ABSTRACT

An asymmetrical bearing is disclosed for use in a gear pump. The bearing may have first and second opposing faces, and first and second bores in communication with the first and second opposing faces. The first and second bores may be configured to receive first and second shafts of a gear pump. The bearing may have a first flat side surface and a second curved side surface, where the second curved side surface includes first and second curved portions associated with the first and second bores, respectively. The first and second faces and the first flat side surface may also include a plurality of grooves configured to direct a flow of process fluid over the bearing during operation of the pump. Self-aligning features can be provided on one or more sealing elements to ensure desired alignment of the sealing components during assembly. Other embodiments are described and claimed.

21 Claims, 21 Drawing Sheets

(56) References Cited

U.S. PATENT DOCUMENTS

| | | | |
|---|---|---|---|
| 3,622,212 A | 11/1971 | Laumont | |
| 3,833,319 A * | 9/1974 | Eglington | 418/132 |
| 5,052,905 A * | 10/1991 | Rustige | 418/132 |
| 5,417,556 A | 5/1995 | Waddleton | |
| 5,641,281 A * | 6/1997 | Russell et al. | 418/102 |
| 5,702,234 A | 12/1997 | Pieters | |
| 6,716,010 B2 | 4/2004 | Eaton et al. | |

* cited by examiner

GEAR PUMP WITH ASYMMETRICAL DUAL BEARING

CROSS-REFERENCE TO RELATED APPLICATIONS

This is a non-provisional of U.S. provisional patent application Ser. No. 61/618,218, filed Mar. 30, 2012, the entirety of which application is incorporated by reference herein.

FIELD OF THE DISCLOSURE

The disclosure generally relates to bearings for use in pump assemblies, and more particularly to an asymmetrical dual bearing for use in pumps such as a metering pump.

BACKGROUND OF THE DISCLOSURE

Gear pumps typically include a housing or plate that holds a set of intermeshing gears. As the gears turn, fluid moves between the gear teeth and the housing and is expelled out the pump due to the intermeshing of the gears. The gears are attached to shafts that run axially from the gear faces, and these shafts must run on one or more bearing surfaces.

Gear pumps find application in a variety of industries. In the case of gear pumps used for polymer extrusion it is important to have the fluid ports as near to the entrance and outlet of the gear "mesh" as possible in order to reduce the amount of time the polymer resides in the pump, and to minimize the total amount of heat added to the polymer by the pump. The housing or plate that contains the gear set includes one or more ports machined into its side. The housing or plate may be substantially wider than the gear set to receive bolts of a flange that attaches to the pump. This extra housing space may accommodate bearings for supporting the gear shafts. Providing discrete shaft bearings allows for better shaft alignment than arrangements in which the shafts are simply mounted in separate plates attached to the gear housing.

Traditionally, where the pump includes a pair of intermeshing gears, two separate bearings have been employed, one for each drive shaft on each side of each gear, resulting in a total of four bearings per pump. The general shape of the traditional gear cavity in the housing is similar to a figure "8". Each bearing may have a round portion with a flat side. The flats sides of two bearings are then aligned and installed into the pump housing as a pair, with one pair on each side of the gears.

The traditional bearings may also include features used to help remove trapped fluid from the gear mesh. Often such features are machined on the individual bearing pieces as two separate features. Because the bearing assemblies are made up of so many individual bearing pieces, it is easy for these features to be misaligned during manufacturing and installation. Such misalignment can cause the pump to perform in a less than desired manner. Moreover, the large number of pieces used in the bearing assembly, and the importance of the inter-fitting of the bearing pairs in the bearings into the bearing cavity, makes assembly of the pump very difficult.

Thus, there is a need for an improved bearing assembly for pumps in general and gear pumps in particular. Such an improved bearing assembly should be easy to install, and should reduce the total number of individual parts required for assembly. The improved bearing assembly should also include features that will reliably enable trapped fluid to be removed from the gear mesh. There is also a need for an improved arrangement that ensures a desired alignment of the components of a gear pump is obtained as the components of the pump are being assembled.

SUMMARY OF THE DISCLOSURE

A bearing is disclosed. The bearing may include first and second opposing faces, and first and second bores in communication with the first and second opposing faces. The first and second bores may be configured to receive first and second shafts. The bearing may also have a first flat side surface and a second curved side surface, and the second curved side surface may have first and second curved portions associated with the first and second bores, respectively. A plurality of grooves may be provided in the first and second opposing faces and the first flat side surface. The plurality of grooves configured to direct a flow of process fluid over the bearing during operation of the bearing.

A pump assembly is also disclosed, comprising a housing; a drive shaft having a first gear; a driven shaft having a second gear; and first and second asymmetrical bearings. Each of the asymmetrical bearings may include first and second opposing faces, and first and second bores in communication with the first and second opposing faces. The first and second bores may be configured to receive first and second shafts. The bearing may also have a first flat side surface and a second curved side surface, and the second curved side surface may have first and second curved portions associated with the first and second bores, respectively. A plurality of grooves may be provided in the first and second opposing faces and the first flat side surface. The plurality of grooves configured to direct a flow of process fluid over the bearing during operation of the pump.

Each of the bores may also be provided with a lubrication groove formed as a portion of a circle that is offset from a center of the respective bore by an offset distance and at an angle "α" with respect to a line perpendicular to the bearing centerline. In one embodiment, this angle "α" is about 35 degrees. The lubrication groove may further be offset by an angle "β" with respect to a line perpendicular to the second face of the bearing so that the lubrication groove runs from the second face to a distance within the respective bore. The lubrication groove may be tapered, or it may be oriented parallel to the bore, extending a predefined distance within the bearing bore.

BRIEF DESCRIPTION OF THE DRAWINGS

By way of example, a specific embodiment of the disclosed device will now be described, with reference to the accompanying drawings.

DETAILED DESCRIPTION

An asymmetrical bearing is disclosed for use in supporting a shaft of a pump. In one embodiment, a single asymmetrical bearing is provided on each side of a pair of gears in a gear pump. The single asymmetrical bearing may support both the drive shaft and the shaft of the driven gear. The asymmetry of the bearing acts to limit the number of degrees of freedom the bearing has during installation. A single bearing can be used on each side of the pump. In addition, the single piece design reduces the total number of parts in the pump, and greatly simplifies the assembly of the pump.

Figure 1:
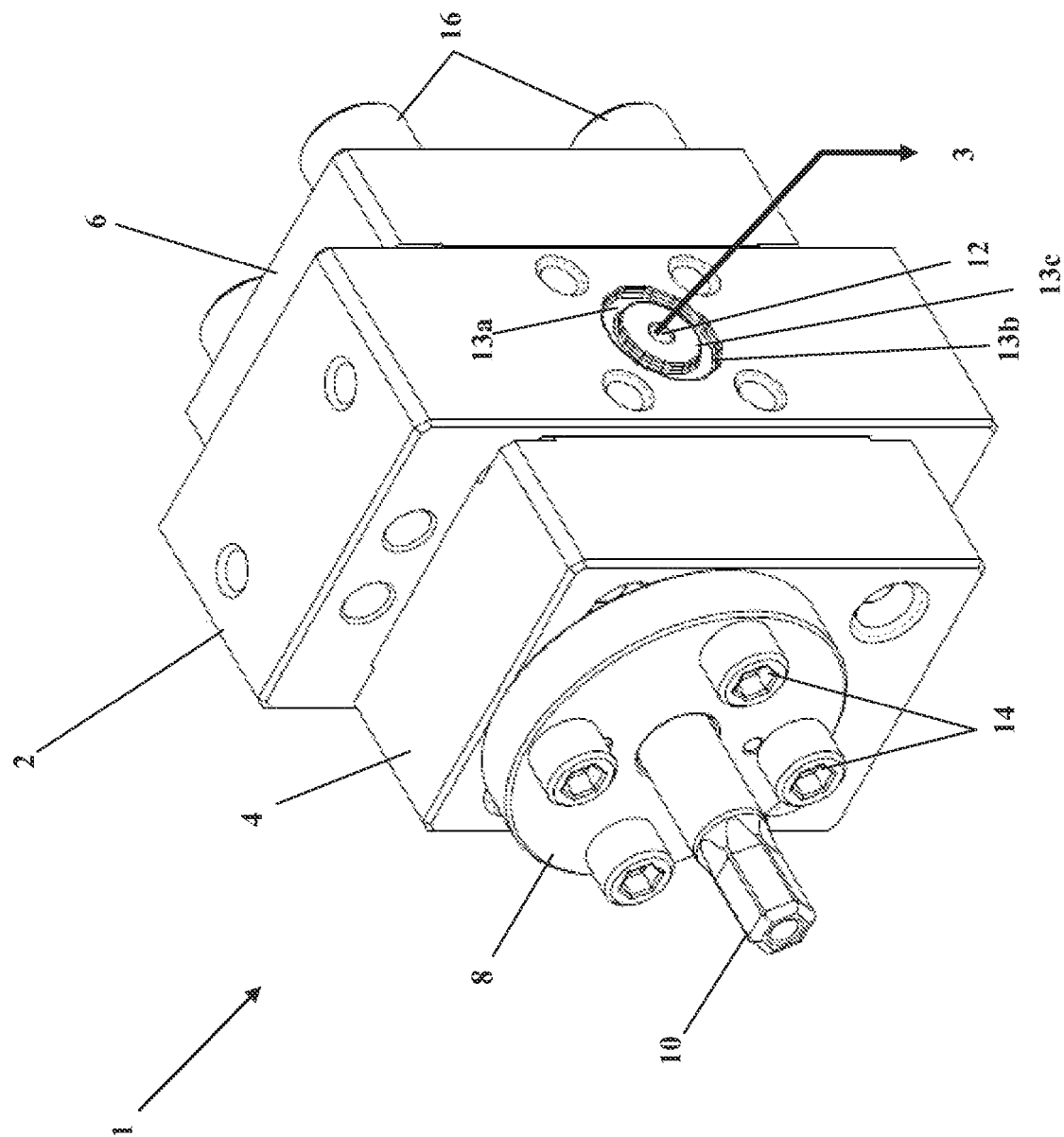
FIG. 1 is a perspective view of a pump including the disclosed bearing.

Referring now to FIG. 1, an exemplary gear pump 1 is shown. The gear pump 1 may include a central gear plate 2, front and rear plates 4, 6, a seal plate 8 and a drive shaft 10. An inlet port (not shown) and an outlet port 12 may be formed in the central gear plate for moving fluid through the pump 1. The inlet and outlet ports may be coupled to inlet and outlet piping or tubing via an o-ring connection. Thus, the central gear plate 2 may include a recess having a flat face portion 13a and first and second angled surfaces 13b, 13c for sealing engagement with an o-ring (not shown). In the illustrated embodiment, the first and second angled surfaces 13b, 13c comprise 12-sided geometric shapes rather than smooth surfaces. The use of a 12-sides geometric shape may facilitate surface machining during manufacture. The pump 1 may be fixed in its assembled form via a plurality of fasteners, which in the illustrated embodiment are socket head cap screws 14, 16.

Figure 2:
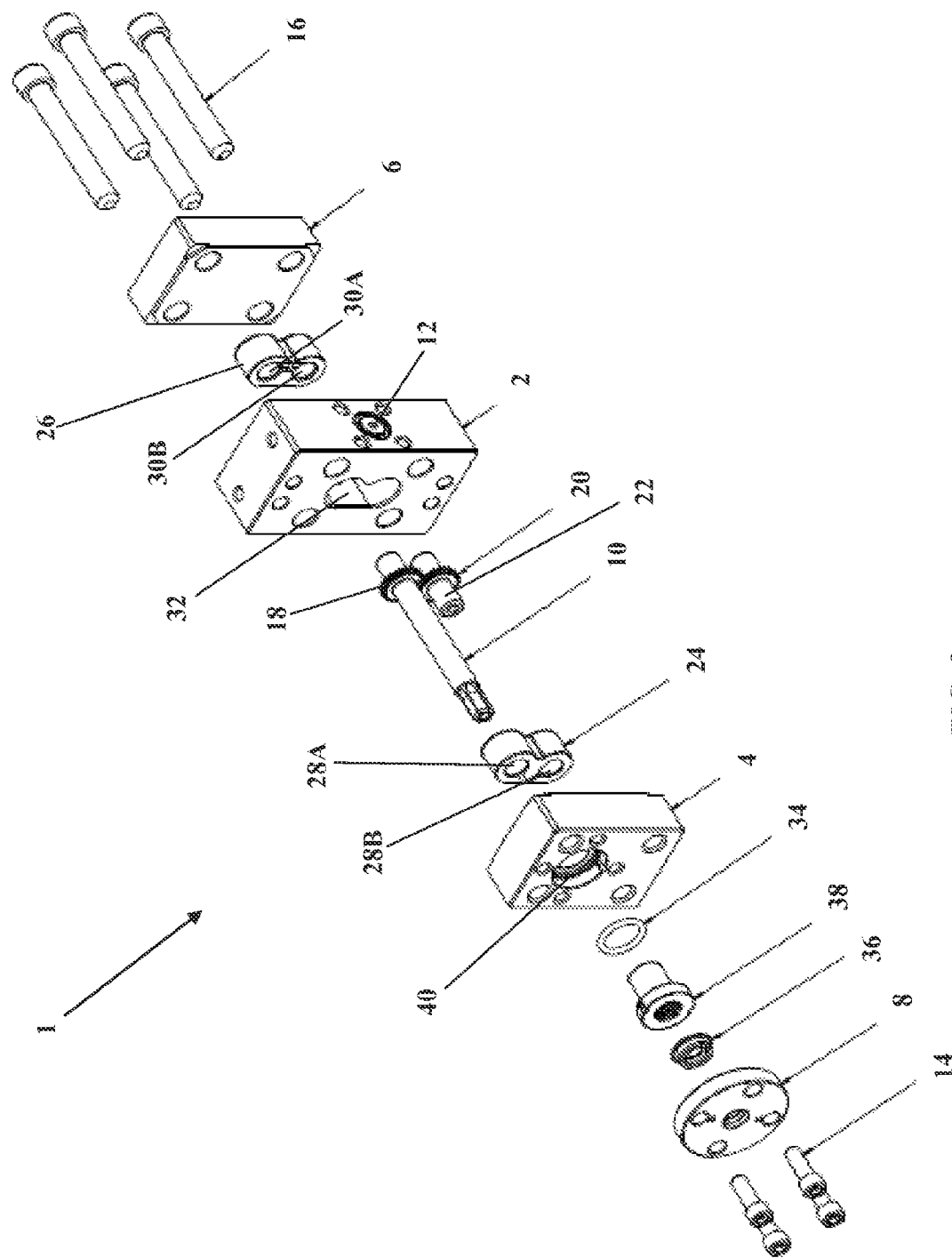
FIG. 2 is an exploded view of the pump of FIG. 1.

FIG. 2 shows the pump 1 in exploded form. As can be seen, the drive shaft 10 includes a first gear 18 which intermeshes with a second gear 20 of a driven shaft 22. First and second asymmetrical bearings 24, 26 are positioned on opposite sides of the first and second gears 18, 20 and receive the drive shaft 10 and drive shaft 22 via respective bores 28A, B, 30A, B. The first and second gears 18, 20 and first and second asymmetrical bearings 24, 26 are received within an asymmetrical opening 32 in the central gear plate 2. In the illustrated embodiment, the asymmetrical opening 32 is shaped to correspond to the shape of the asymmetrical bearings 24, 26, which facilitates installation of the bearings and maintains their alignment during operation.

Figure 3:
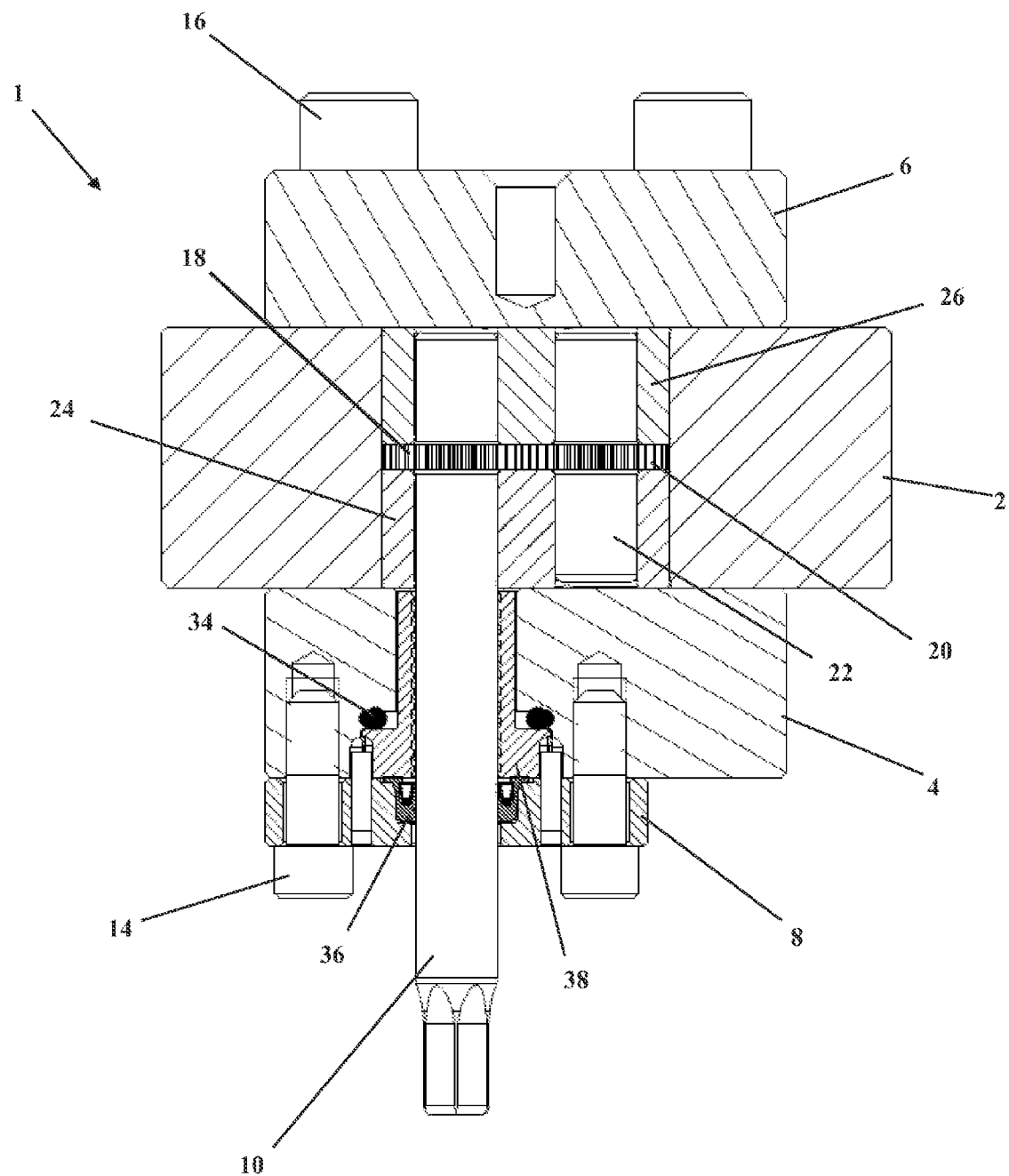
FIG. 3 is a cross-section view of the pump of FIG. 1 taken along line 3-3 of FIG. 1.
Figure 4:
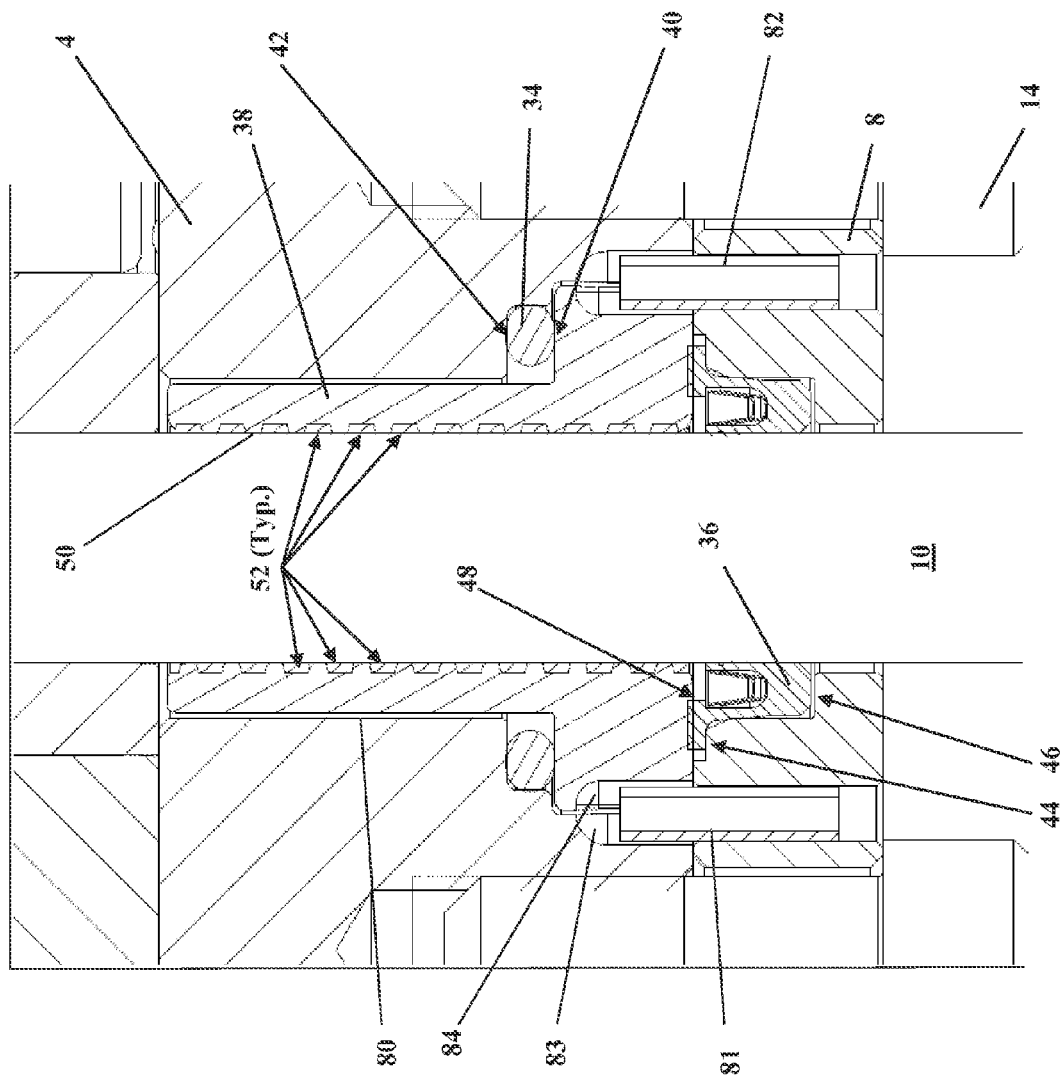
FIG. 4 is detail view of the cross-section view of FIG. 3.
Figure 5:
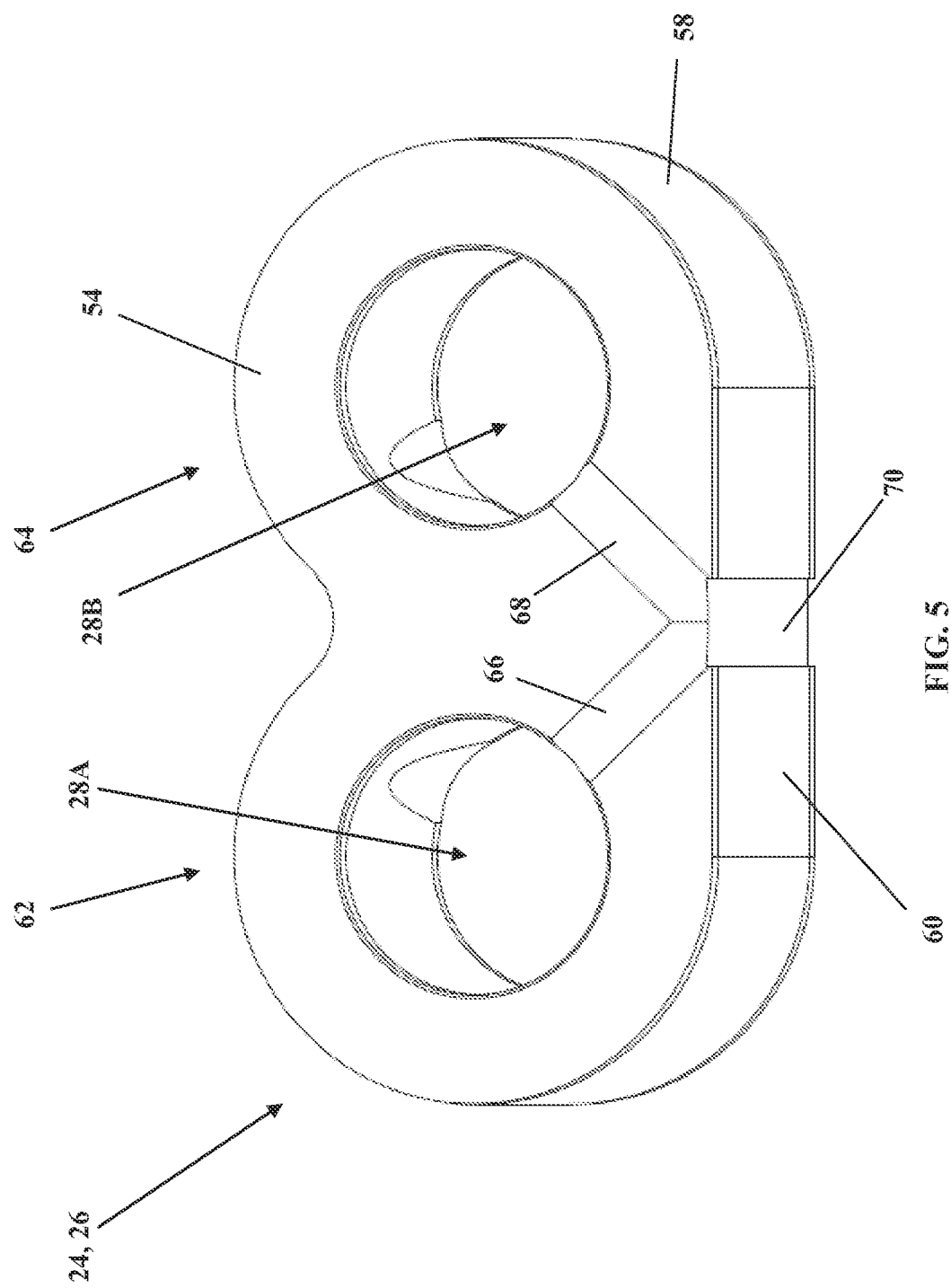
FIG. 5 is a perspective view of a dual bearing for use in the pump of FIG. 1.
Figure 6:
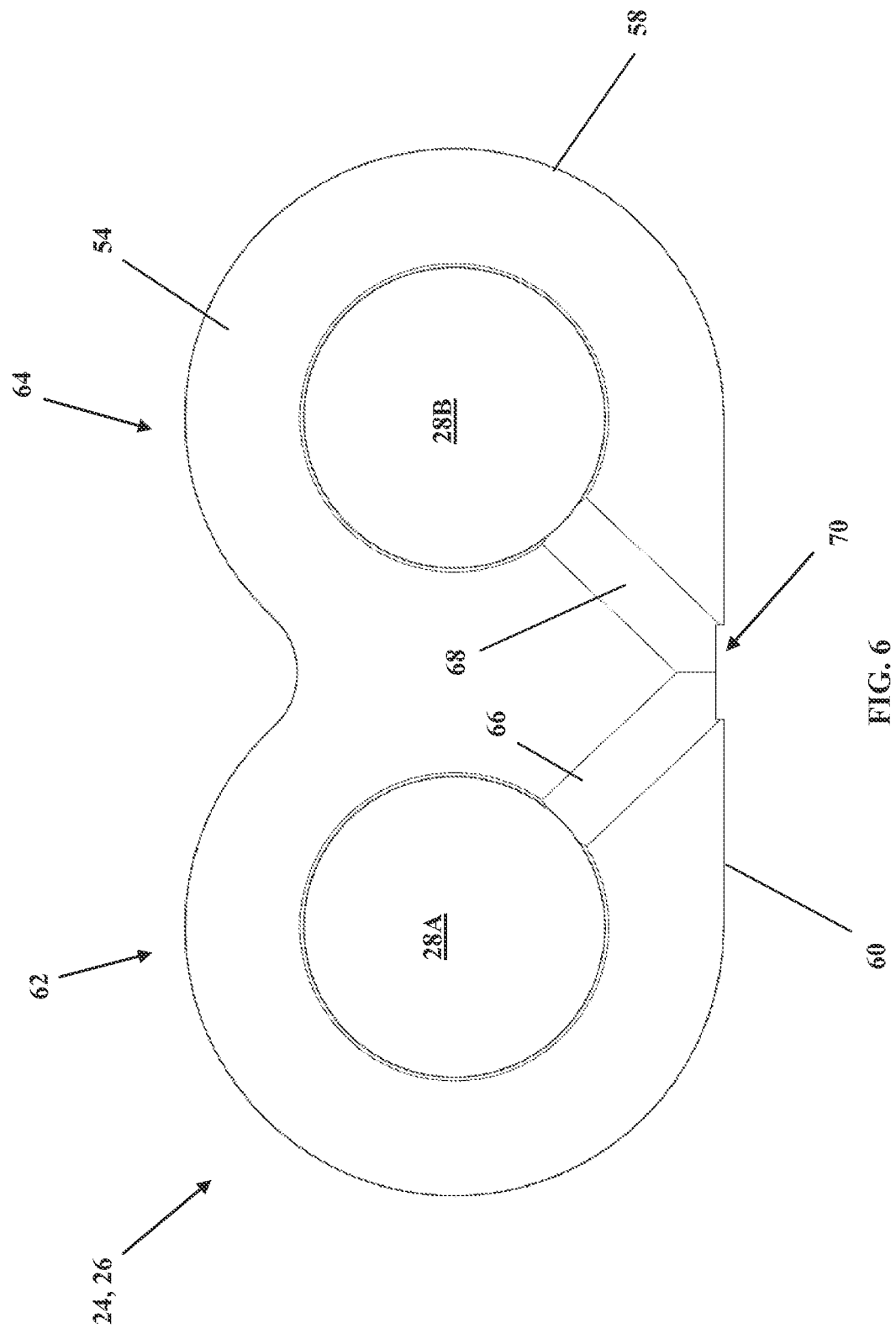
FIG. 6 is a plan view of the dual bearing of FIG. 5.

The seal plate 8 may fix a variety of sealing elements to the front plate 4 to prevent fluid leakage around the drive shaft 10. The sealing elements may include an o-ring 34, a lip seal 36 and a sealing sleeve 38, all of which may be received in a suitably configured recess 40 in the front plate 4. FIGS. 3 and 4 show the internal inter-relation of components of the pump 1 when assembled. As can be seen, the o-ring 34 is sandwiched between a rim portion 40 of the sealing sleeve 38 and a shoulder portion 42 of the front plate 4. Likewise, the lip seal 36 is sandwiched between first and second shoulder portions 44, 46 of the seal plate 8 and a front face 48 of the sealing sleeve 38. An inner bore 50 of the sealing sleeve 38 includes a plurality of grooves 52 for sealing against the surface of the rotating drive shaft 10. In some embodiments, the grooves 52 comprise a helical groove which allows the sealing sleeve 38 to act as a screw-type pump during operation. As fluid attempts to leave the gear pump (around the outer diameter of the drive shaft 10), the shaft's rotary motion forces the fluid into the groove 52. This creates a pressure greater than the pressure forcing the fluid out of the pump, and forces the fluid back toward the central gear plate 2. Thus arranged, the pumped fluid is prevented from leaking past the drive shaft 10 during operation.

Pins 81, 82 are received in grooves 83, 84 to prevent rotation of the sealing sleeve 38. The outside diameter of the sealing sleeve 38 is sized to loosely fit within bore 80 of the front plate 4, while the inside diameter of the sealing sleeve 38 is sized to fit closely to the shaft 10. The sealing sleeve 38 is compliantly mounted between the o-ring 34 and the lip seal 36 so that sealing sleeve 38 can always align to the shaft 10. Thus arranged, the pumped fluid is prevented from leaking past the drive shaft 10 during operation.

Referring now to FIGS. 5-9, the asymmetrical bearings 24, 26 will be described in greater detail. It is noted that although the description will proceed in relation to bearing 24, the identical description will apply to bearing 26. The bearing 24 may be a generally flat structure having first and second faces 54, 56 and a side surface 58 that is flat on a first side 60 and forms a pair of lobes 62, 64 on an opposite second side. The resulting configuration gives the bearing 24 the appearance of the letter "B."

The first face 54 may include first and second grooves 66, 68 that run from a common position on the first side 60 and which each intersect with one of the bores 28A, 28B that receive the drive shaft 10 and the driven shaft 22. A notch 70 may be provided on the first side 60 where the grooves 66, 68 meet. This notch 70 may run from the first face 54 to the second face 56. The first and second grooves 66, 68 (and notch 70) may have any of a variety of cross-sectional shapes and depths, as desired for the particular application. In one embodiment, the grooves are about 0.010 inches deep and about 0.100 inches wide, though this is not critical and the grooves may be of different shapes and depths as desired. For example, the groove width may be about $1/20^{th}$ of the radius of curvature of one or both lobes 62, 64, while the groove depth may be about $1/200^{th}$ of the radius of curvature of one or both lobes 64.

It will also be appreciated that in alternative embodiments, the grooves could instead be disposed on a portion of the front plate 4. In addition, the notch 70 could be provided in the gear plate 2 in lieu of the bearing 24.

Figure 7:
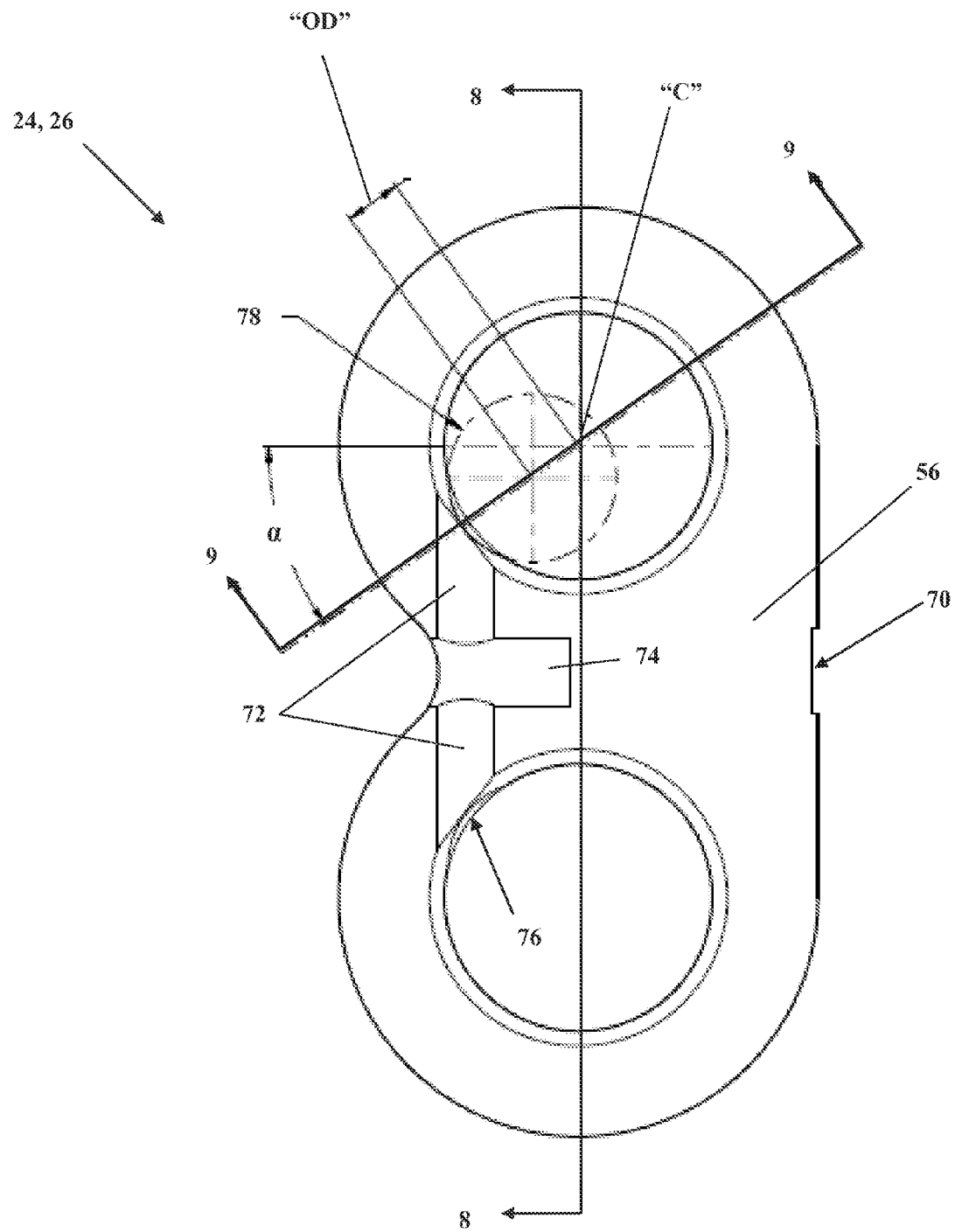
FIG. 7 is a reverse plan view of the dual bearing of FIG. 5.
Figure 8:
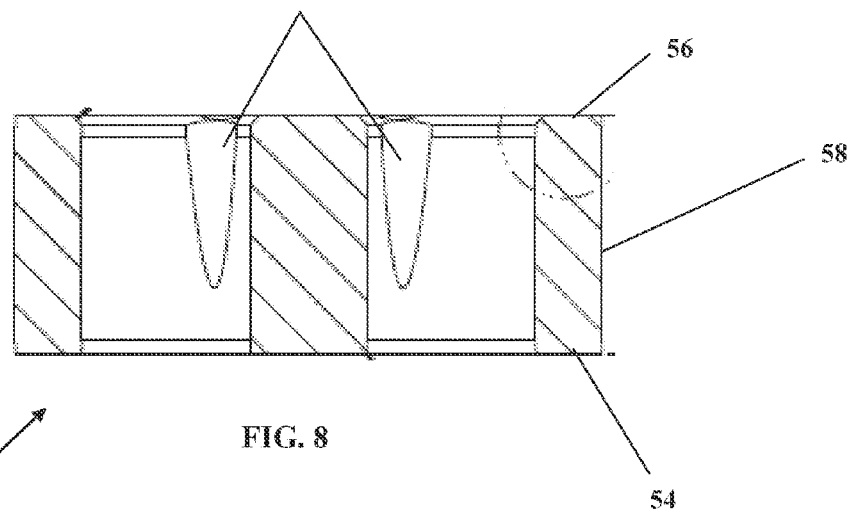
FIG. 8 is a cross-section of the dual bearing of FIG. 5 taken along line 8-8 of FIG. 7.

FIG. 7 shows that grooves may also be provided in the second face 56 of the asymmetrical bearing 24. Thus, a third groove 72 may run between the bores 28A, 28B and may be bisected by a fourth groove 74 that runs from a position on the side surface 58 where the lobes 62, 64 intersect to a point generally between the centers of the bores 28A, 28B. As can be seen, the third groove 72 is offset with respect to the centers of the bores 28A, 28B so that it intersects the bores roughly at a tangent. This is not critical, however, and third groove 72 could be angled toward the centers of one or both bores. In one embodiment, the grooves are about 0.010 inches deep and about 0.100 inches wide, though this is not critical and the grooves may be of different shapes and depths as desired.

Figure 9:
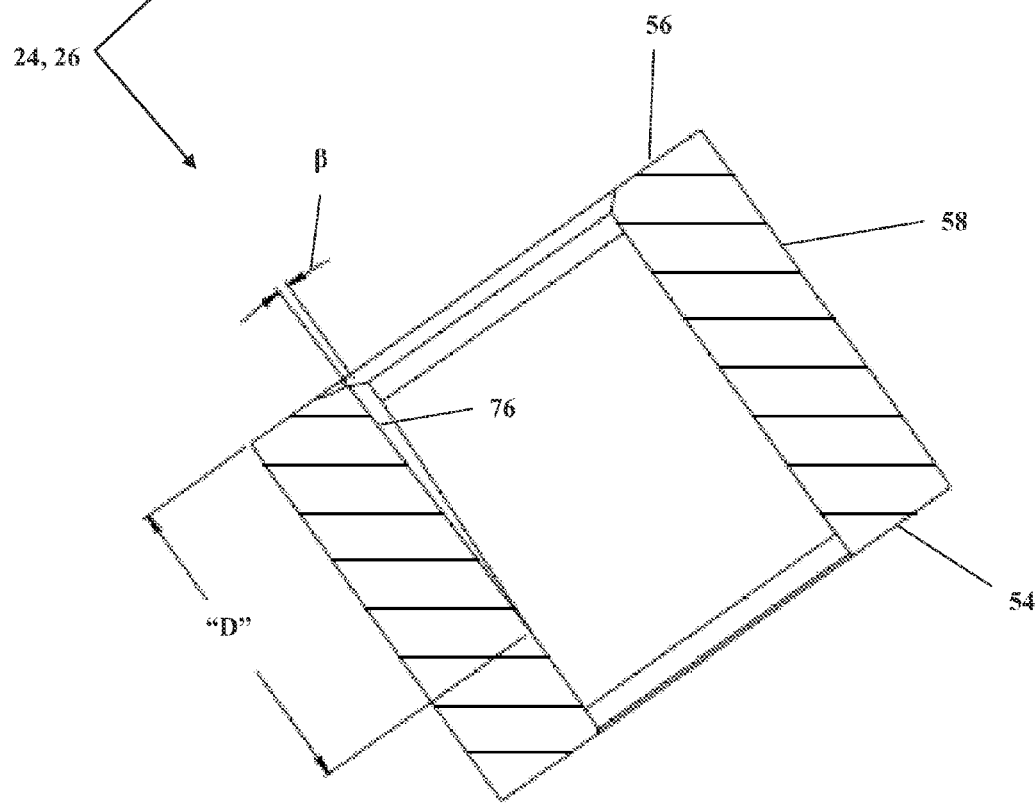
FIG. 9 is a cross-section of the dual bearing of FIG. 5 taken along line 9-9 of FIG. 7.
Figure 10:
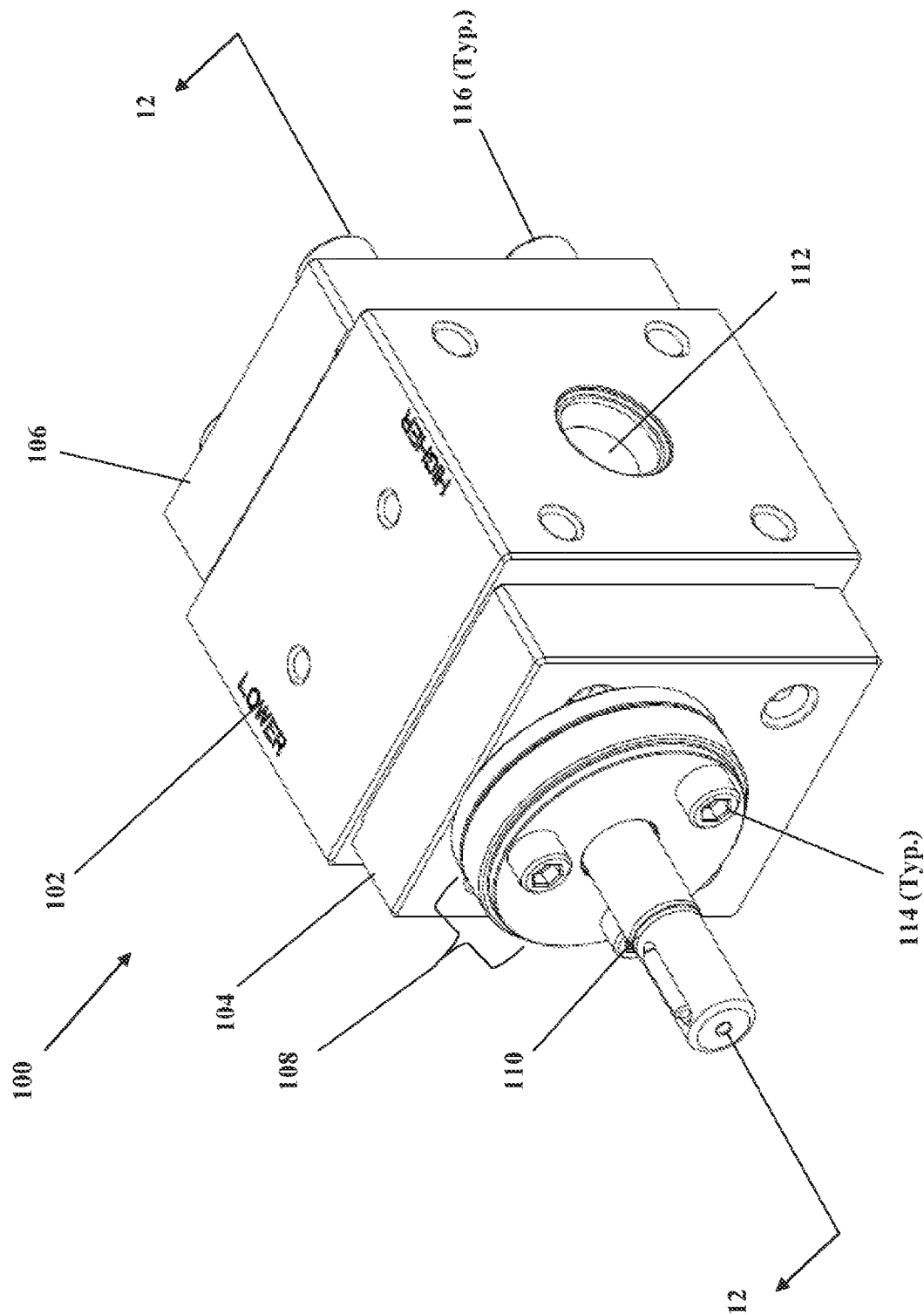
FIG. 10 is an isometric view of a pump according to the disclosure.

Each of the bores 28A, 28B may also be provided with a lubrication groove 76 in the region in which the bores intersect with third groove 72. This lubrication groove 76 may be formed as a portion of a circle 78 that is offset from a center "C" of the respective bore by an offset distance "OD," and at an angle "α" with respect to a line perpendicular to the bearing centerline (represented by section line 8-8). In one embodiment, "α" is about 35 degrees. As can be seen in FIG. 9, the lubrication groove 76 may further be offset by an angle "β" with respect to a line perpendicular to the second face 56 so that the lubrication groove 76 runs from the second face 56 to a distance "D" within the respective bore 28A, 28B. It will be appreciated that although the lubrication groove 76 is shown as being tapered, that the groove could instead be machined so that it is not tapered (i.e., (β=0) so that the groove 76 extends a predefined distance within the bearing bore.

In addition to the above, a small angled transition may be applied to the profile of the entire bearing as well as the profile of the housing or plate where the bearing is installed. These transitions may help allow any angular misalignment to self-correct itself and allow smooth assembly of the bearing in the housing or plate.

Lubrication of the shafts is always a priority in gear pumps, and the shafts are typically lubricated by fluid being pumped. While many efforts have been made to provide flow paths for the fluid through the bearings, the disclosed design is unique in that one of the features used to help promote fluid flow through the bearings also is used to manufacture the part.

During manufacturing of the bearing, the piece is held in place with a small amount of excess material. Once machining is finished, the excess material is removed and the notch 70 is created. This notch 70 functionally serves to fluidly connect the inlet port are with surface 54, and may act as a return flow path for the fluid used to lubricate the bearings. Thus, in the illustrated embodiment, high pressure fluid is directed along the second face 56 of the bearing 24, into a groove in the bores 28A, 28B in the bearing 24, down the first face 54 of the bearing to the notch 70 and finally returns to the low pressure inlet of the pump. As an additional aid in lubrication, an axial groove is created by the lubrication groove 76. It will be appreciated that other methods to convey the fluid to the low pressure inlet may be employed, such as holes in the gear housing plate.

As will be appreciated, the orientation of the asymmetric design is important in promoting fluid flow in the pump. The disclosed asymmetric design creates a cavity on the inlet for the fluid being pumped to collect before being carried around the gear pocket by the gear form. This pool of fluid helps to ensure that the pump does not starve itself during operation and will run at its maximum capacity. The groove 74 is also used to help remove trapped fluid from the gear mesh, extends from a critical dimension off of the centerline of the pump, depending on the gear form, and extends the entire length of the part in a cylindrical fashion.

Referring now to FIGS. 10-13, a gear pump 100 will be described that includes features that may result in enhanced alignment of sealing elements and may also facilitate assembly of one or more components of the pump. The gear pump 100 may be similar to the gear pump 1 described in relation to FIGS. 1-4. Thus, the pump 100 may include a central gear plate 102, front and rear plates 104, 106, a seal assembly 108 and a drive shaft 110. An inlet port (not shown) and an outlet port 112 may be formed in the central gear plate for moving fluid through the pump 100. The pump 1 may be fixed in its assembled form via a plurality of fasteners, which in the illustrated embodiment are socket head cap screws 114, 116.

Figure 11:
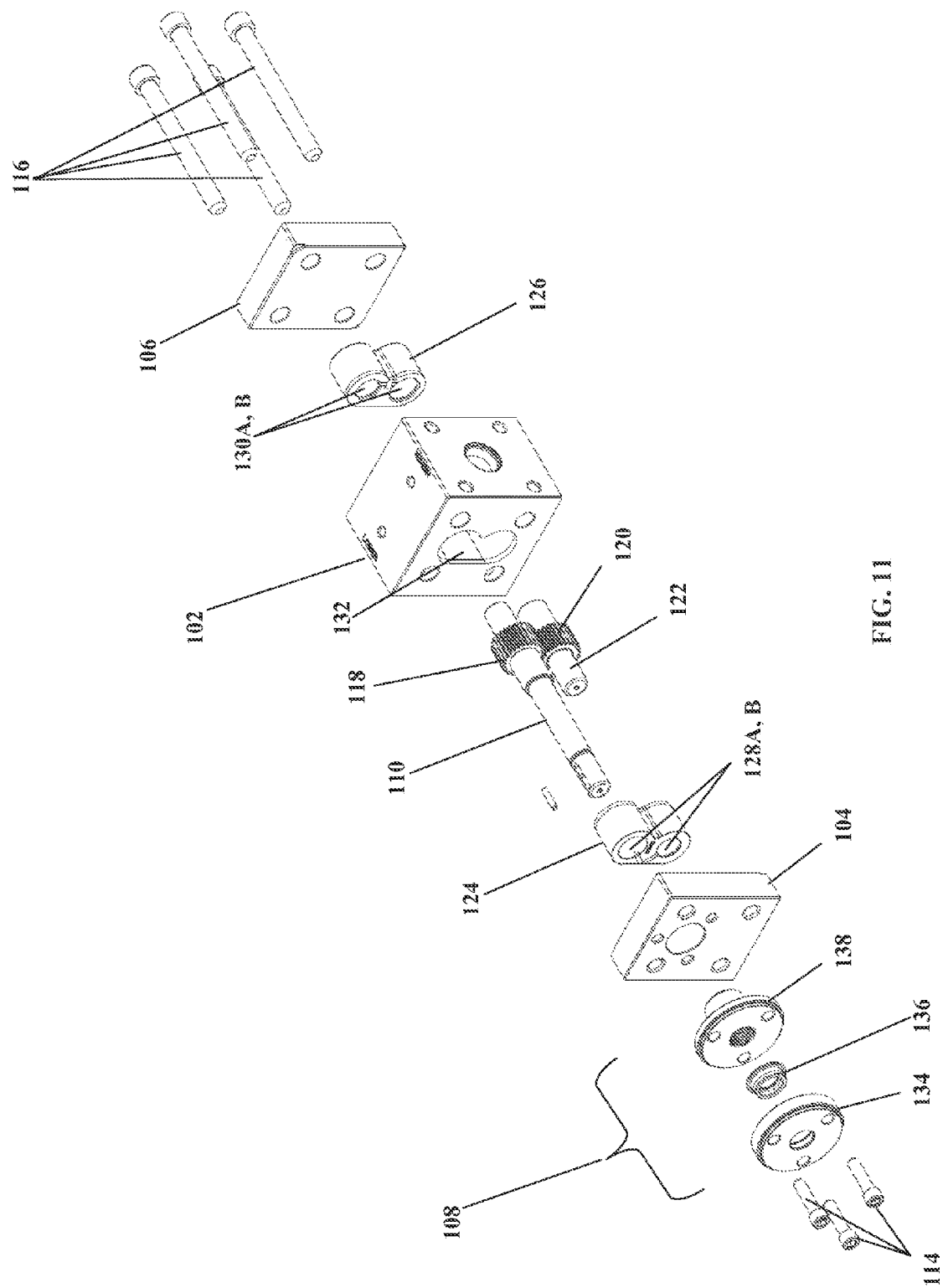
FIG. 11 is an exploded view of the pump of FIG. 10.
Figure 12:
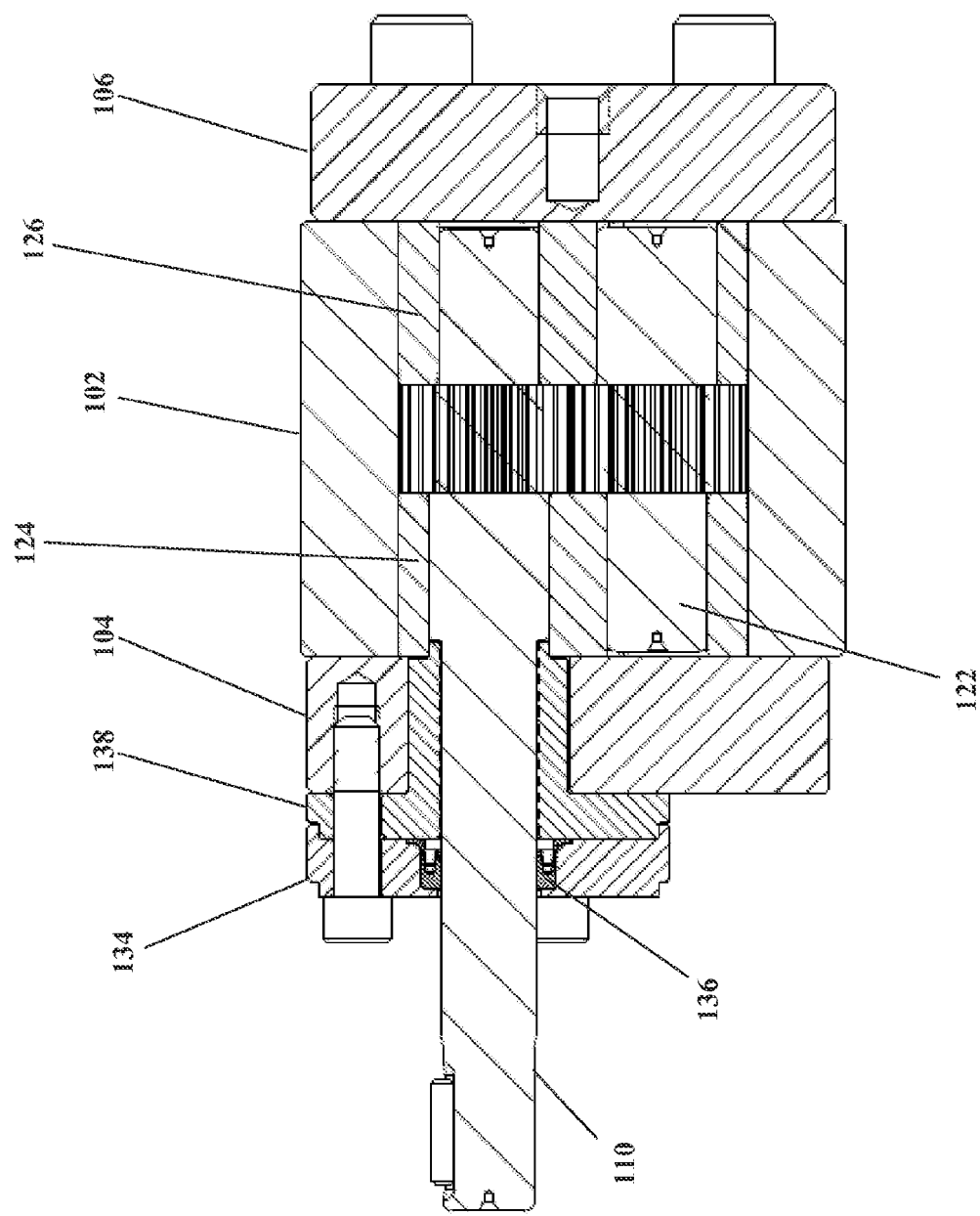
FIG. 12 is a cross-section of the pump of FIG. 10 taken along line 12-12 of FIG. 10.

FIG. 11 shows the pump 100 in exploded form. As can be seen, a drive shaft 110 includes a first gear 118 which intermeshes with a second gear 120 of a driven shaft 122. First and second asymmetrical bearings 124, 126 are positioned on opposite sides of the first and second gears 118, 120 and receive the drive shaft 110 and driven shaft 122 via respective bores 128A, B, 130A, B, respectively. The first and second gears 118, 120 and first and second asymmetrical bearings 124, 126 are received within an asymmetrical opening 132 in the central gear plate 102. In the illustrated embodiment, the asymmetrical opening 132 is shaped to correspond to the shape of the asymmetrical bearings 124, 126, which may facilitate installation of the bearings and maintain their alignment during operation. As will be appreciated, the first and second asymmetrical bearings 124, 126 can have any of the features of the bearings 24, 26 described in relation to FIGS. 5-9.

The seal arrangement 108 may include a plurality of sealing elements configured to prevent fluid leakage around the drive shaft 110. In the illustrated embodiment, the sealing arrangement 108 comprises a lip seal housing 134, a lip seal 136 and a sealing sleeve 138, which may be fixed together in the stacked relation shown in FIG. 12-13. The lip seal 136 may be held in a recess formed in the lip seal housing 134. A circumferential flange portion 140 of the lip seal 136 may be sandwiched between the lip seal housing 134 and a front surface 142 of the sealing sleeve 138. The lip seal 136 may form a radial seal around the drive shaft 110, and may form a face seal between the sealing sleeve 138 and the lip seal housing 134 (the face seal is facilitated by the flange portion 140 of the lip seal 136).

A cylindrical body portion 144 of the sealing sleeve 138 may be received in an opening 146 of the front plate 104. In the illustrated embodiment, the distal end 148 of the cylindrical body portion 144 includes a reduced diameter portion 150 that is sized to be received within the bore 128A of asymmetric bearing 124 to align the sealing sleeve within the pump 100. By piloting the sealing sleeve 138 directly off of the asymmetric bearing 124 via a tight fit on the reduced diameter portion 150 of the sealing sleeve 138, central bore 152 of the sealing sleeve 138 is precisely located relative to the outer diameter 156 of the driveshaft 110, thus reducing the likelihood for contact between the drive shaft and the sealing sleeve, and also minimizing any eccentricity between the drive shaft and the sealing sleeve.

The sealing sleeve 138, lip seal 136 and lip seal housing 134 may all have corresponding central bores which receive a portion of the drive shaft 110 therethrough. The central bore 152 of the sealing sleeve 138 may include a helical groove 154 which allows the sealing sleeve to act as a screw-type pump during operation, as previously described in relation to the embodiment of FIGS. 1-4.

The pump 100 may further include alignment, or "piloting" features on the sealing elements, thus improving concentricity between the axes of the sealing elements and the axis of the shaft, which are otherwise independent features. As shown, the sealing sleeve 138 includes a flange portion 158 having a forward facing circumferential alignment recess 160 disposed adjacent to the perimeter of the flange portion. As will be appreciated this alignment recess 160 can be used to align one or more secondary seals. In the illustrated embodiment, the alignment recess 160 receives a rearward protruding circumferential lip portion 162 of the lip seal housing 134. By fitting the circumferential lip portion 162 into the alignment recess 160, a desired high degree of concentricity between the axis of the drive shaft 110 and the lip seal axis can be achieved. As shown, the lip seal housing 134 includes its own alignment recess 164 disposed on a forward facing portion of the housing. This alignment recess 164 can be used to align additional sealing elements (not shown), as desired.

During assembly, the sealing sleeve 138 may be bolted to the front plate 104. There may be a loose clearance fit between the outer surface of the cylindrical body portion 144 of the sealing sleeve and the front plate 104. Since the sealing sleeve is not tightly located on the front plate 104, this loose fit reduces the chances of pump binding during assembly, when the bolts 114 are tightened. The sealing sleeve 138 and lip seal housing 134 can be bolted to the front plate 104 without the cylindrical body portion 144 of the sealing sleeve touching the through bore in the front plate 104. The locating feature on the sealing sleeve 138 (i.e., the interaction between the reduced diameter portion 150 of the sealing sleeve and the bore 128A of asymmetric bearing 124) can be used to align this assembly to the rest of the pump. The front plate 104, seal assembly 108 and remainder of the pump components can then be fastened together with fasteners 116. As will be appreciated, the disclosed arrangement can improve sealing performance, and can make pump assembly easier.

Figure 14:
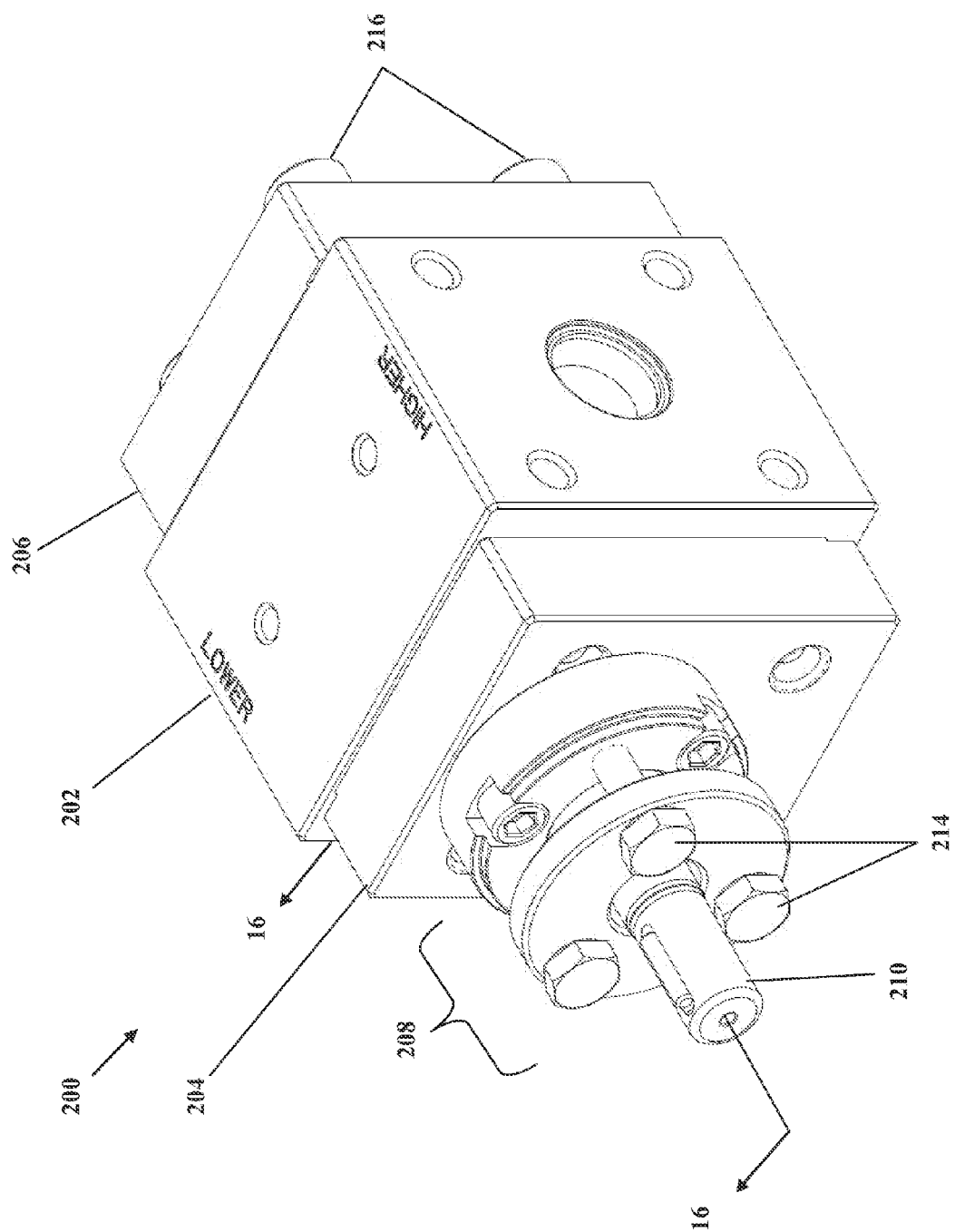
FIG. 14 is an isometric view of a pump according to the disclosure.
Figure 15:
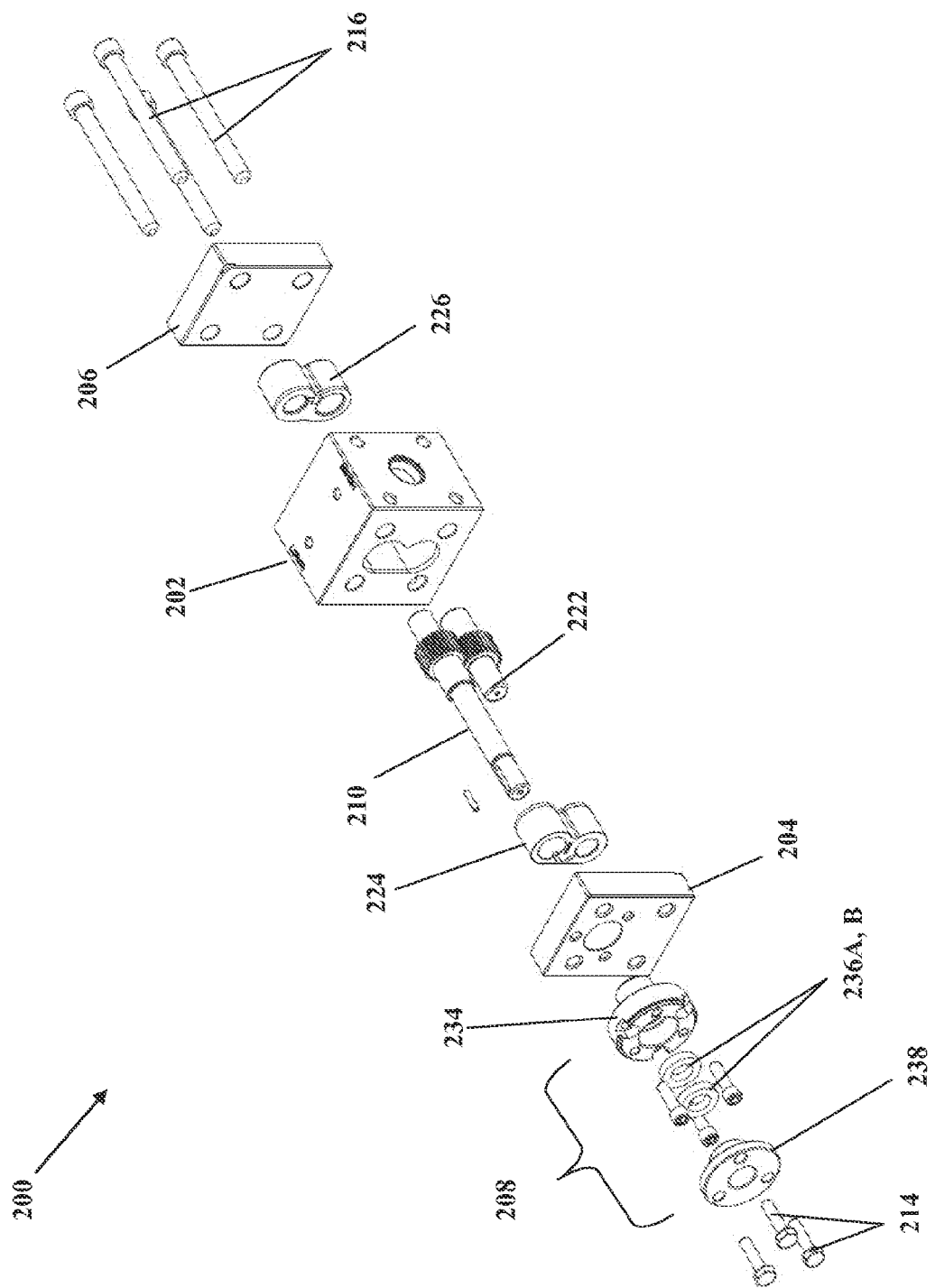
FIG. 15 is an exploded view of the pump of FIG. 14.
Figure 16:
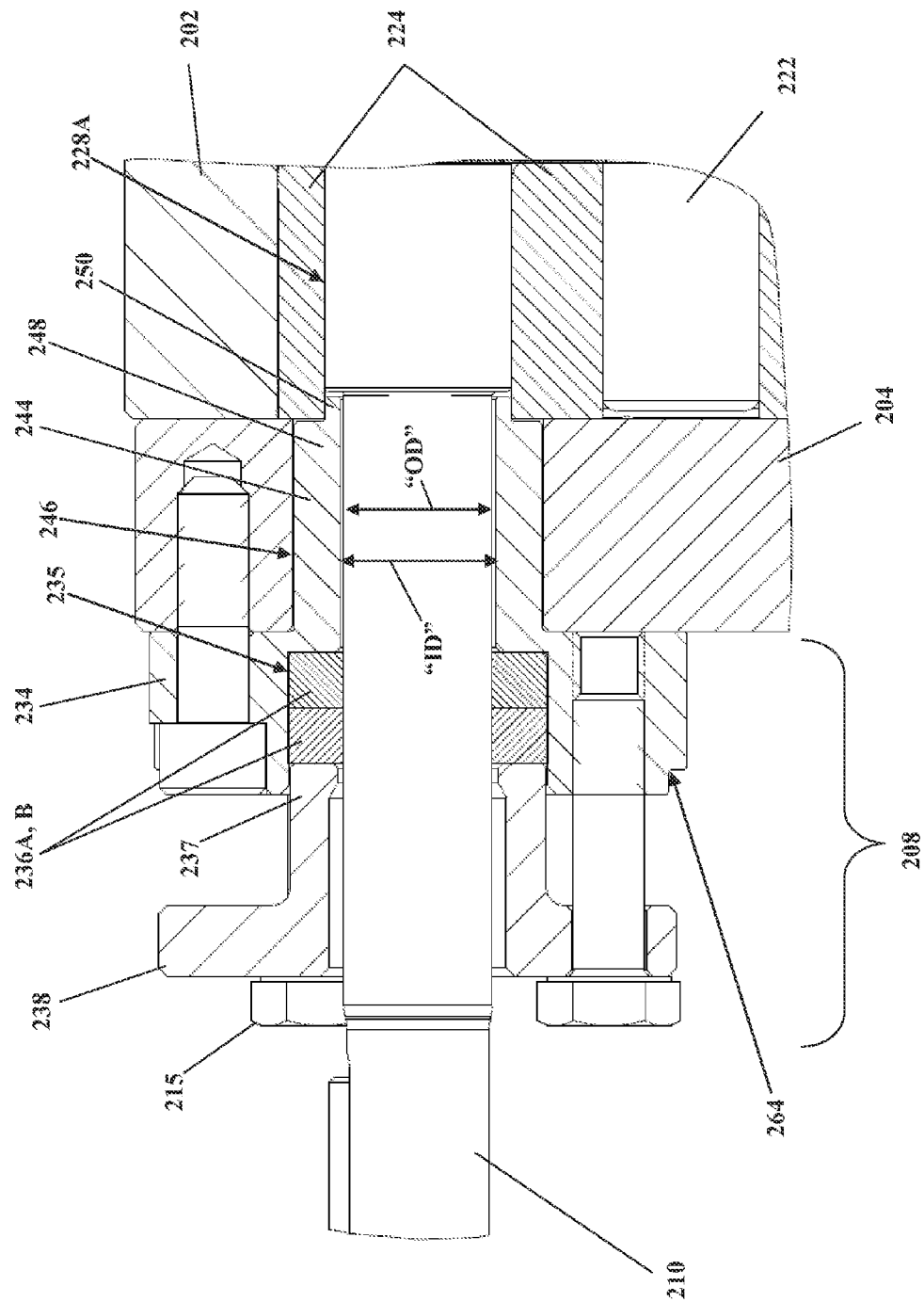
FIG. 16 is a cross-section of the pump of FIG. 14 taken along line 16-16 of FIG. 14.

Referring now to FIGS. 14-16, a gear pump 200 will be described that includes a packing seal arrangement for preventing fluid leakage past the drive shaft 210. The gear pump 200 of this embodiment may include some or all of the features of the previously described pumps 1, 100, including central gear plate 202, front and rear plates 204, 206, a seal assembly 208 and a drive shaft 210. An inlet port (not shown) and an outlet port 212 may be formed in the central gear plate for moving fluid through the pump 200. The pump 200 may be fixed in its assembled form via a plurality of fasteners 214, 216. The pump 200 may also include first and second asymmetrical bearings 224, 226 that engage the drive shaft 210 and a driven shaft 222. The asymmetrical bearings 224, 226 may have any of the features of the bearings 24, 26 described in relation to FIGS. 5-9.

The seal assembly 208 of pump 200 may comprise a packing housing 234, packing seals 236A, B and a packing follower 238. This packing housing 234 has a bore defining an inside diameter "ID" that is larger than the outside diameter "OD" of the drive shaft 210. The packing housing 234 may also include a recess 235 formed at a forward end configured to receive a pair of packing seals 236A, B. The recess 235 may also receive a rearwardly projecting portion 237 of the packing follower 238. As will be understood, the rearwardly projecting portion 237 of the packing follower compresses the packing seals 236A, B within the recess 235 to provide a desired sealing engagement with the "OD" of the drive shaft 210. Compression of the packing seals 236A, B can be adjusted via fasteners 215.

A cylindrical body portion 244 of the packing housing 234 may be received in an opening 246 of the front plate 204. In the illustrated embodiment, a distal end 248 of the cylindrical body portion 244 includes a reduced diameter portion 250 that is sized to be received within the bore 228A of asymmetric bearing 224 to align the packing housing 234 within the pump 200. By piloting the packing housing 234 directly off of the asymmetric bearing 224 via a tight fit on the reduced diameter portion 250 of the packing housing 234, the "ID" of the packing housing 234 is precisely located relative to the outer diameter "OD" of the driveshaft 210, thus reducing the likelihood for contact between the drive shaft and the packing housing, and also minimizing any eccentricity between the drive shaft and the packing housing.

In the illustrated embodiment, the packing housing 234 also includes an alignment recess 264 disposed on a forward facing portion of the housing. This alignment recess 264 can be used to align additional sealing elements (not shown), as desired. In addition, the disclosed design can be modular in that additional packing rings with an additional packing housing can be included.

Figure 17:
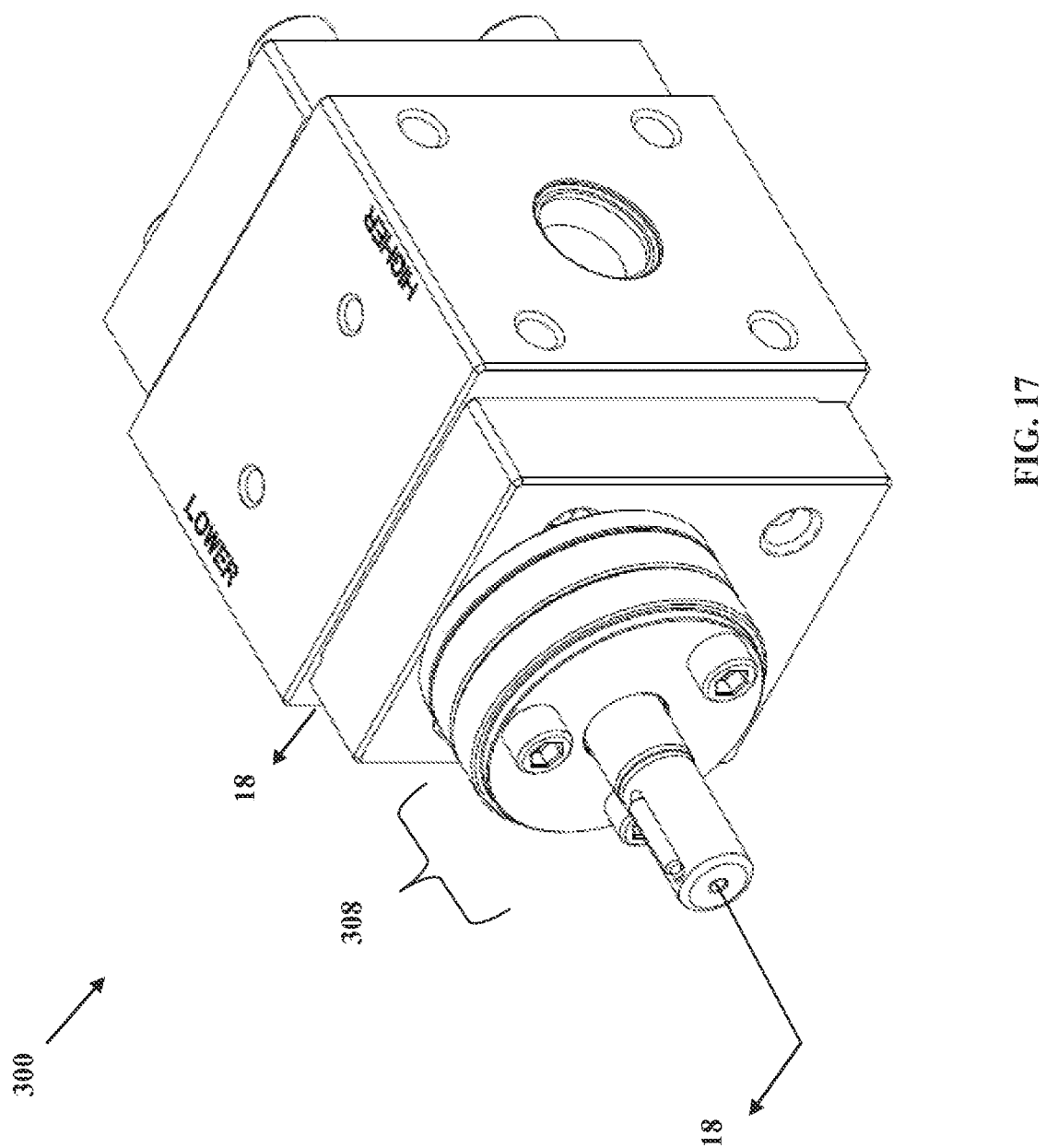
FIG. 17 is an isometric view of a pump according to the disclosure.
Figure 18:
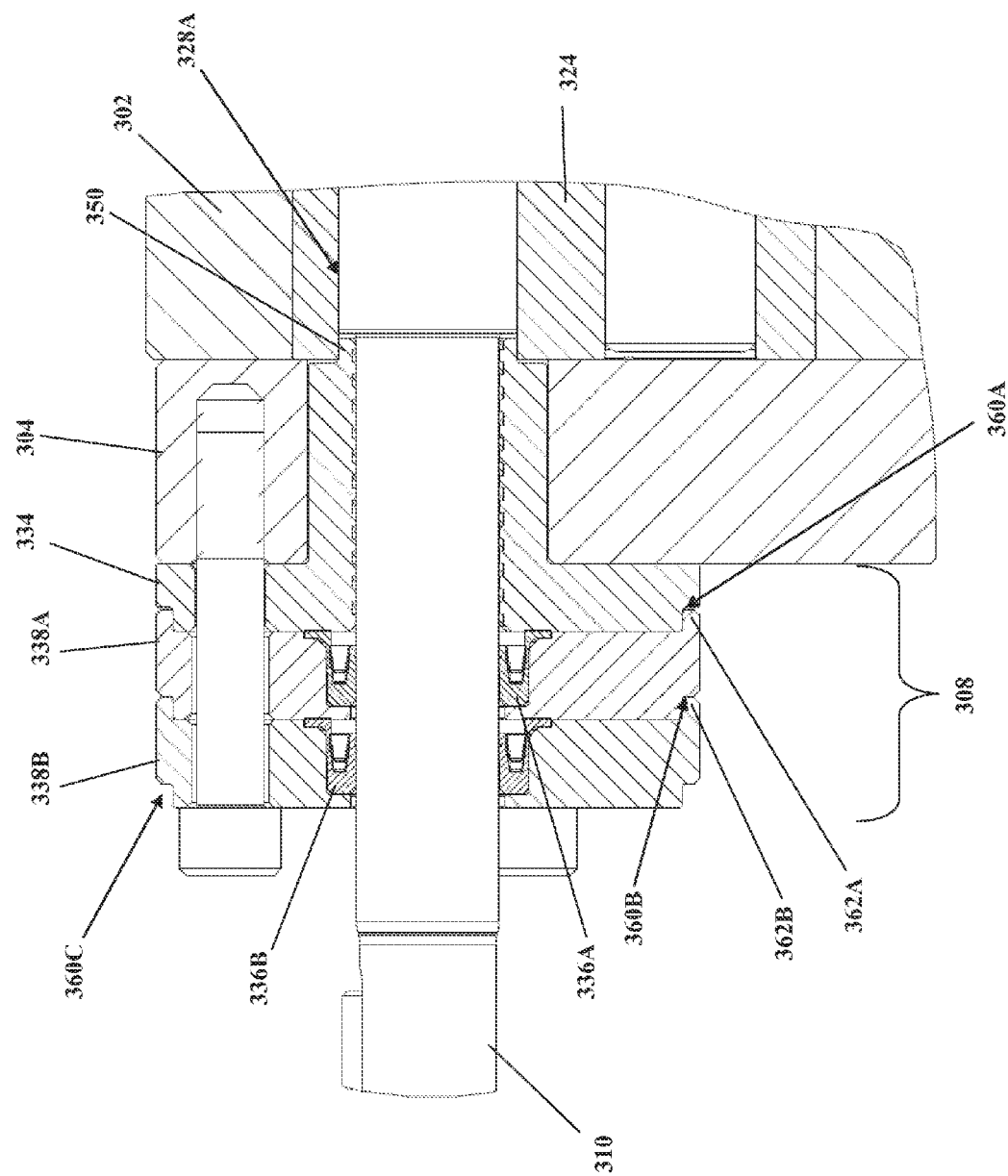
FIG. 18 is a cross-section of the pump of FIG. 17 taken along line 18-18 of FIG. 17.

FIGS. 17-18 show a gear pump 300 that is similar to the pump 100 described in relation to FIGS. 10-13. The gear pump 300 of this embodiment, however, has a seal assembly 308 that includes a pair of lip seal housings 338A, B and a pair of lip seals 336A, B, in addition to the sealing sleeve 334. The sealing sleeve 334 of this embodiment may include any or all of the features of the sealing sleeve described in relation to FIGS. 10-13.

The embodiment of FIGS. 17-18 illustrates that the disclosed aligning features (circumferential alignment recesses 360A, 360B in the sealing sleeve 334 and the lip seal housing 338A engaging circumferential lip portions 362A, 362B in the lip seal housings 338A, B) can be employed to add additional sealing options to the basic sealing configuration shown in FIGS. 10-13, thus exemplifying how the seal design can be modular, or configurable.

In this embodiment, the sealing sleeve 334 is aligned via the asymmetrical bearing 324 in the same manner as described in relation to the embodiment of FIGS. 10-13 (i.e., via reduced diameter portion 350 received in the bore 328A of the bearing 324). The first lip seal housing 338A piloted off the sealing sleeve 334 (i.e., via the interengagement of recess 360A and lip 362A), while the second lip seal housing 338B is piloted off of the first lip seal housing 338A (i.e., via the interengagement of recess 360B and lip 362B). As can be seen, the first and second lip seal housings 338A, B receive the first and second lip seals 336A, B, respectively, resulting in a pair of face seals. As will be appreciated, this arrangement allows the sealing sleeve 334 and both lip seals 336A, B to be precisely aligned to the drive shaft 310. As will also be appreciated, additional lip seal housings and lip seals can be added as desired. For this purpose, the second lip seal housing 338B includes a circumferential alignment groove 360C on a forward face thereof.

Figure 19:
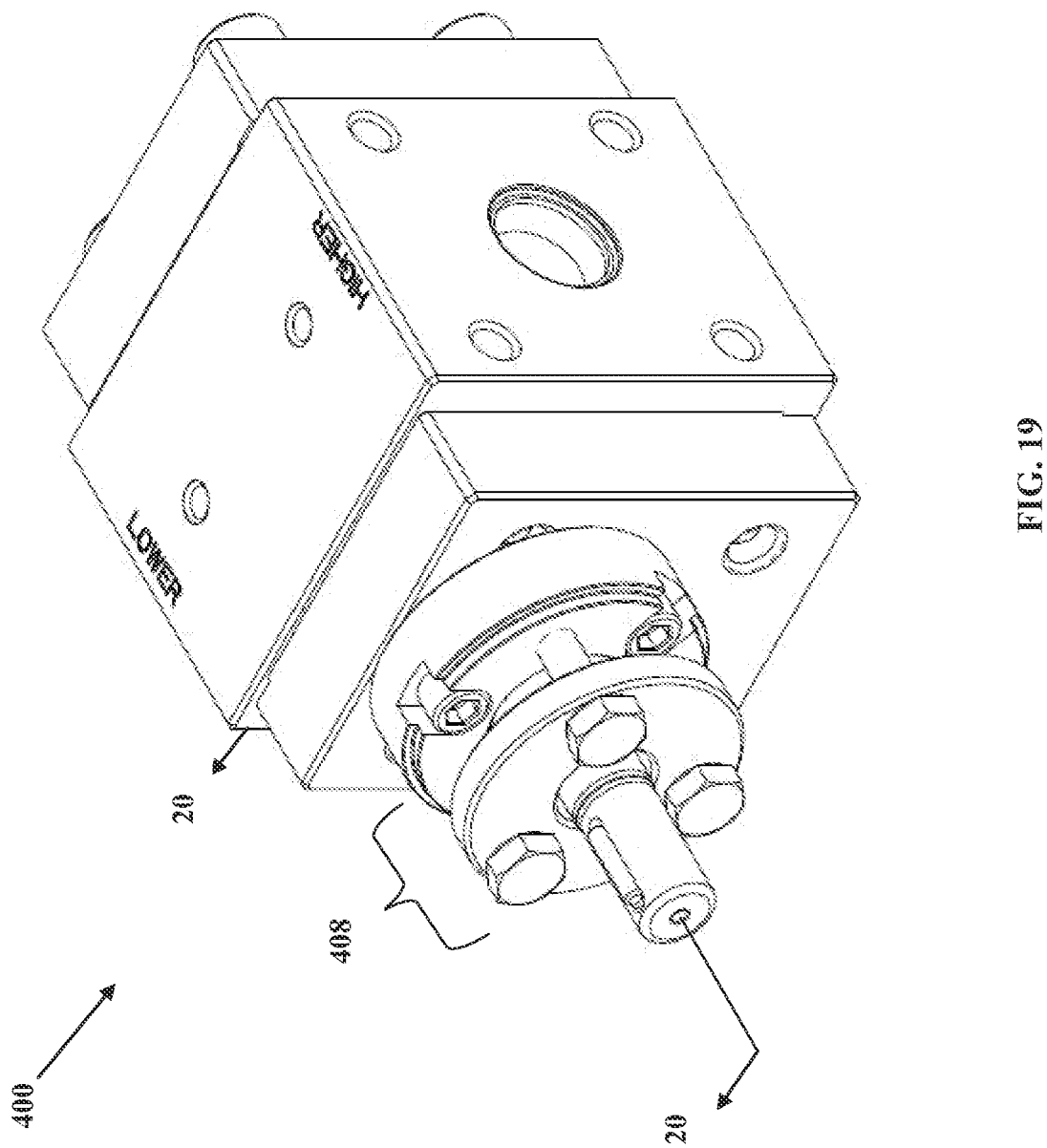
FIG. 19 is an isometric view of a pump according to the disclosure.
Figure 20:
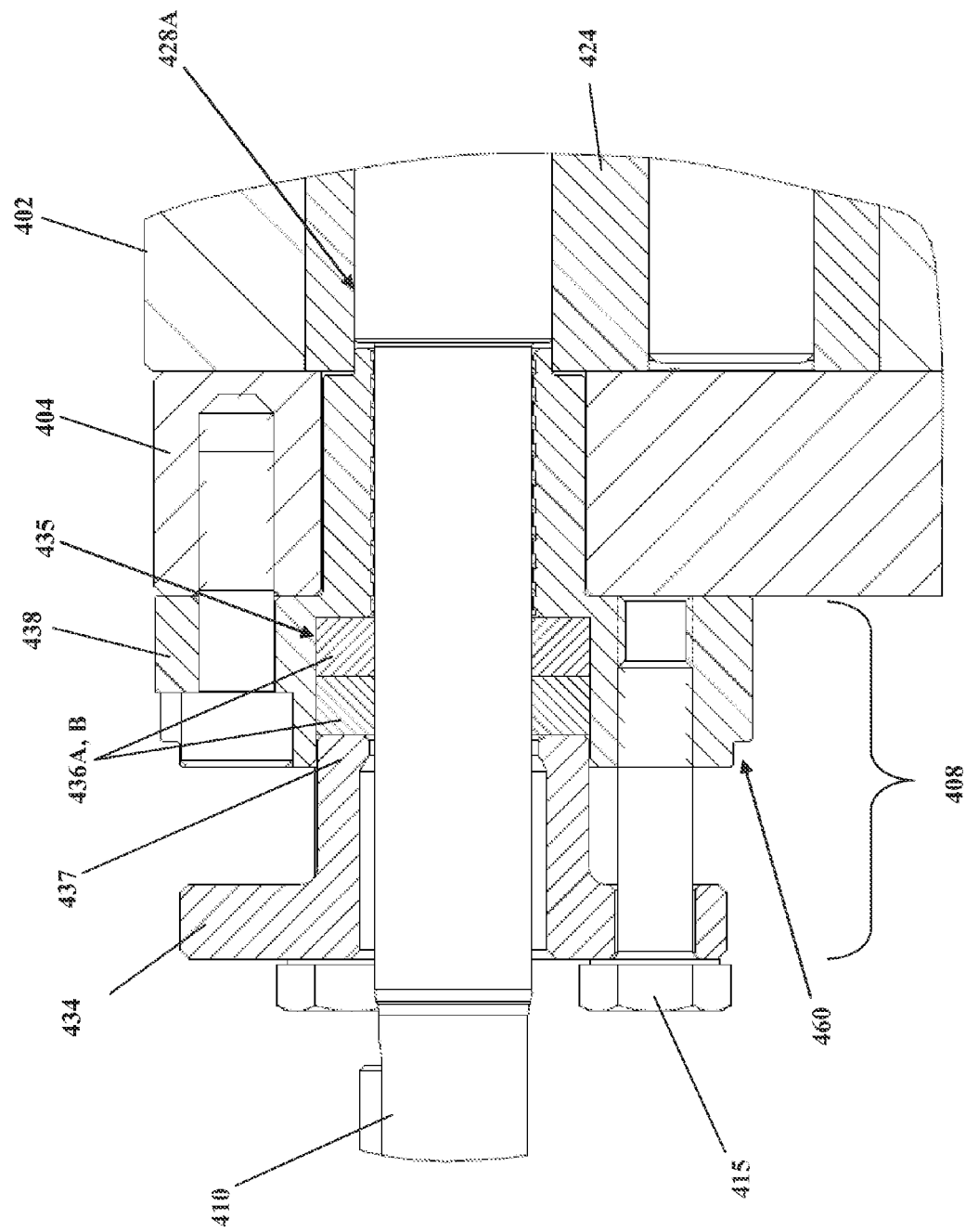
FIG. 20 is a cross-section of the pump of FIG. 19 taken along line 20-20 of FIG. 19.

FIGS. 19-20 show a gear pump 400 that is similar to the previously described pumps, but which includes a seal assembly 408 that is a hybrid of the sealing sleeve and the packing seal designs. Specifically, the seal assembly 408 includes a sealing sleeve 438, a pair of packing rings 436A, B and a packing follower 434. The sealing sleeve 438 of this embodiment may include any or all of the features of the sealing sleeve described in relation to FIGS. 10-13. In addition, the sealing sleeve 438 includes a recess 435 for receiving the packing rings 436A, B. Thus, the sealing sleeve 438 acts as a packing housing. The recess 435 may also receive a rearwardly projecting portion 437 of the packing follower 434. As will be understood, the rearwardly projecting portion 437 of the packing follower compresses the packing seals 436A, B within the recess 435 to provide a desired sealing engagement with the drive shaft 410. Compression of the packing seals 436A, B can be adjusted via fasteners 415.

Figure 13:
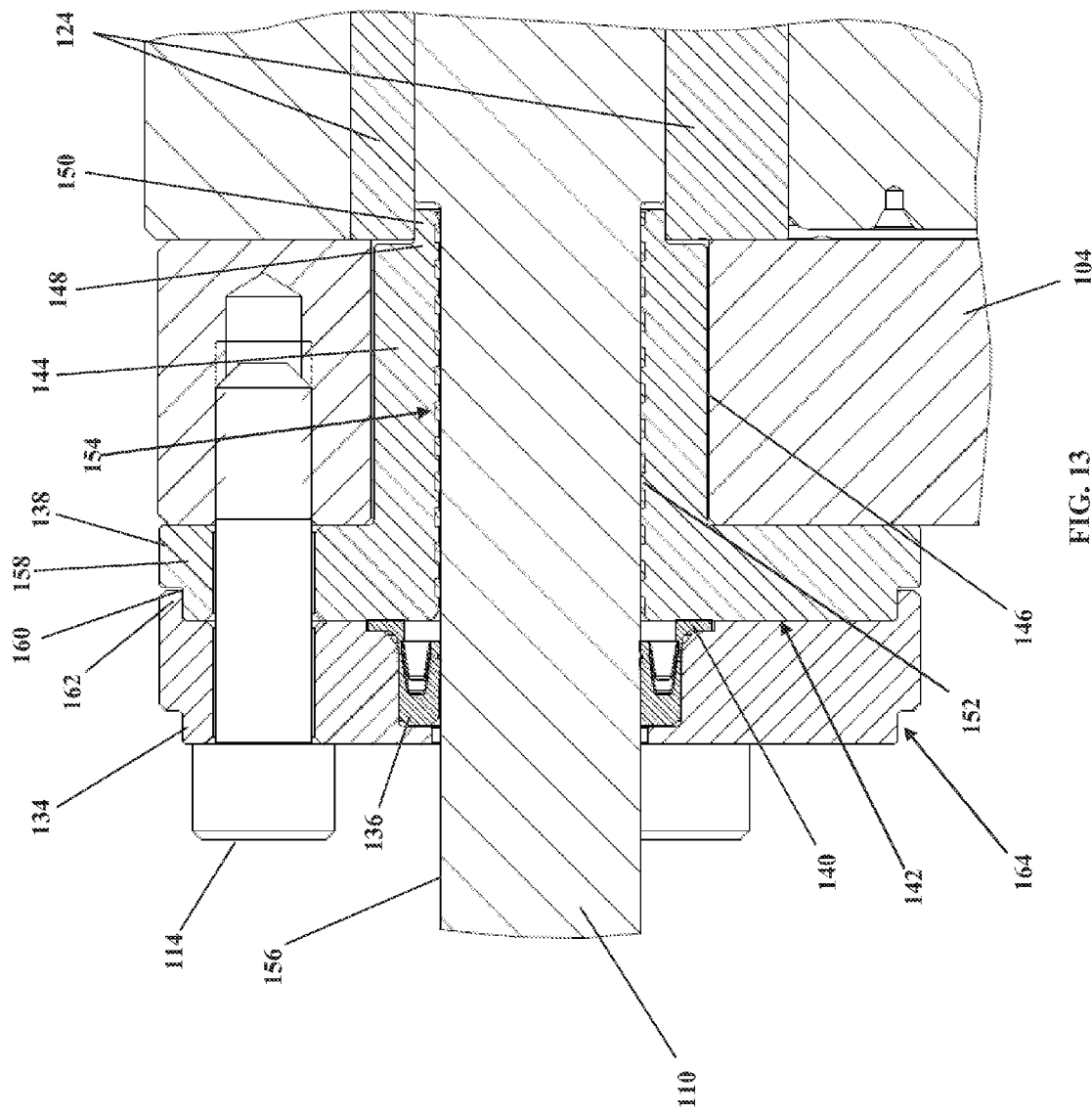
FIG. 13 is a partial detail view of the cross-section view of FIG. 12.

Thus arranged, the sealing sleeve 438 is aligned by the bore 428A of the asymmetric bearing 424 in the manner previously described in relation to FIGS. 13 and 18. The packing seals 436A, B are installed and aligned within the recess 435 in the sealing sleeve so that they are concentric to the drive shaft 410. The packing follower 434 is then bolted to the sealing sleeve 438. In this embodiment, the sealing sleeve 438 also includes an external alignment groove 460 which can be used to add another packing housing and additional packing rings, if desired.

Figure 21:
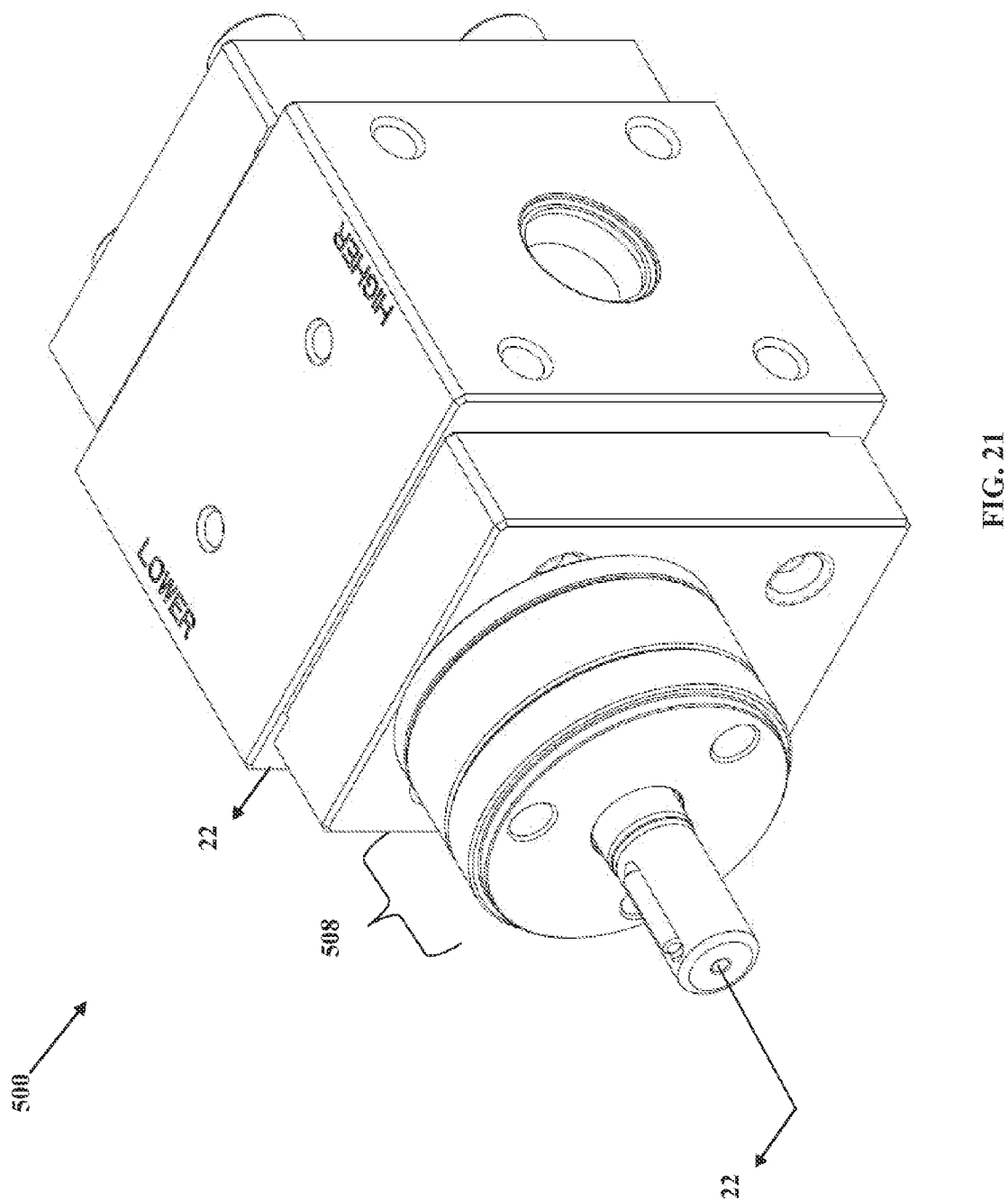
FIG. 21 is an isometric view of a pump according to the disclosure.
Figure 22:
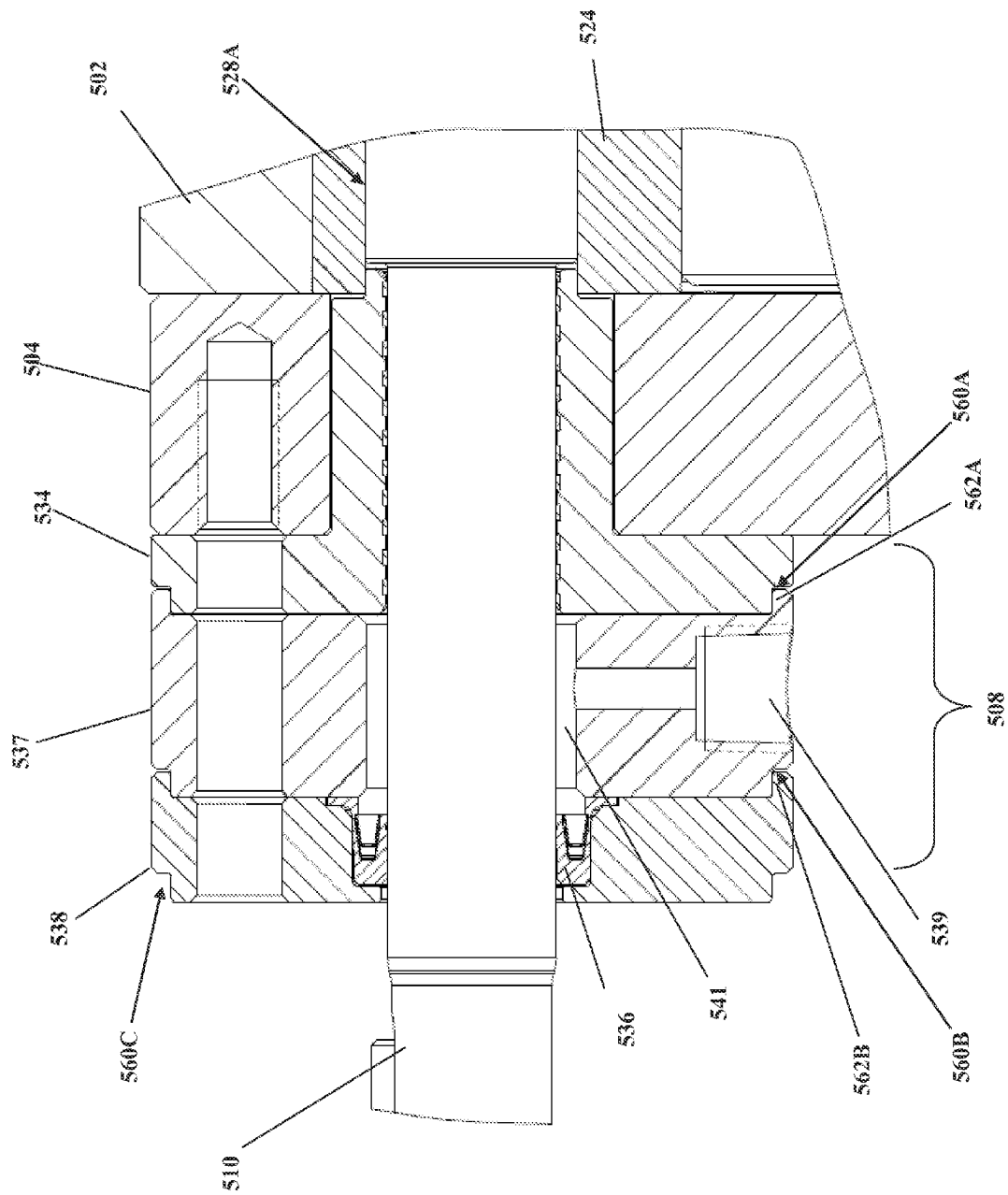
FIG. 22 is a cross-section of the pump of FIG. 21 taken along line 22-22 of FIG. 21.

FIGS. 21-22 show yet another option for the disclosed modular seal design. The pump 500 of this embodiment incorporates a seal assembly 508 that includes a flush plate 537 in combination with a lip seal housing 538, a lip seal 536, and a Rheoseal 534. The lip seal housing 538, lip seal 536, and sealing sleeve 534 can all include the features described in relation to previous embodiments.

As will be appreciated, the flush plate 537 can be used to flush out the inside of the lip seal 536 and any fluid that may escape between the drive shaft 510 and the sealing sleeve 534. In one embodiment, flush fluid is introduced through a port 539, filling a cavity 541 around the drive shaft 510 and inside the lip seal 536. The flush fluid may be discharged through another port (not shown) in the flush plate 537.

The lip seal housing 538, flush plate 537, and sealing sleeve 534 may all be aligned in the pump 500 in a manner previously described. Thus, the sealing sleeve 534 may be piloted to the bore 528A of the asymmetrical bearing 524 in the manner previously described in relation to the embodiment of FIG. 13. The flush plate 537 may have a rearwardly facing circumferential lip portion 562A that is received in a complementary alignment recess 560A formed in a forward face of the sealing sleeve 534. The lip seal housing 538, likewise, may have a rearwardly facing circumferential lip portion 562B that is received in a complementary alignment recess 560B formed in a forward face of the flush plate 537. The lip seal 536 may be held within a recess in the lip seal housing 538 in the manner previously described in relation to other embodiments. The lip seal housing 538 may also include a circumferential alignment recess 360C formed in a forward face thereof so that additional sealing components can be added and aligned. Thus arranged, concentricity between the lip seal 536, sealing sleeve 534 and the drive shaft 510 is maintained.

Based on the foregoing information, it will be readily understood by those persons skilled in the art that the invention is susceptible of broad utility and application. Many embodiments and adaptations of the invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the invention or otherwise exclude any such other embodiments, adaptations, variations, modifications or equivalent arrangements; the invention being limited only by the claims appended hereto and the equivalents thereof. Although specific terms are employed herein, they are used in a generic and descriptive sense only and not for the purpose of limitation.

What is claimed is:

1. A pump, comprising
a housing;
a drive shaft having a first gear;
a driven shaft having a second gear; and
first and second asymmetrical bearings, each of the asymmetrical bearings having:
first and second opposing faces and first and second bores configured to receive the drive shaft and the driven shaft;
a first flat side surface and a second curved side surface, the second curved side surface having first and second curved portions associated with the first and second bores, respectively; and
a plurality of grooves in the first and second opposing faces and the first flat side surface, the plurality of grooves configured to direct a flow of process fluid over the bearing during operation of the pump.

2. The pump of claim 1, wherein the first and second bores of at least one of the asymmetrical bearings further includes a lubrication groove.

3. The pump of claim 2, wherein the lubrication groove is formed as a portion of a circle that is offset from a center of the respective bore by an offset distance, and at an angle "α" with respect to a line perpendicular to the bearing centerline.

4. The pump of claim 2, at wherein the lubrication groove is offset by an angle "β" with respect to a line perpendicular to the second face of the bearing so that the lubrication groove runs from the second face to a distance "D" within the bore.

5. The pump of claim 2, at wherein the lubrication groove is perpendicular to the second face of the bearing and runs from the second face to a distance "D" within the bore.

6. The pump of claim 1, further comprising a seal assembly comprising first and second sealing elements, the first and second sealing elements including corresponding alignment features that interengage with each other to result in a desired alignment of the first and second sealing elements with the drive shaft when the pump is assembled.

7. The pump of claim 6, wherein a distal end of the first sealing element is received within the first or second bore of the first or second asymmetrical bearing.

8. The pump of claim 7, wherein the second sealing element includes a circumferential lip configured to be received in a circumferential recess in the first sealing element.

9. The pump of claim 8, wherein the first sealing element is a sealing sleeve, and the second sealing element is a lip seal housing containing a lip seal, the lip seal providing a face sealing feature via engagement with the sealing sleeve and a shaft sealing feature via engagement with the drive shaft.

10. The pump of claim 9, further comprising a flush plate disposed between the sealing sleeve and the lip seal housing, the flush plate including a flush port for introducing fluid to an outer portion of the drive shaft and to an inner portion of the lip seal, the flush plate further comprising a circumferential lip configured to be received in the circumferential recess in the sealing sleeve, and a circumferential recess configured to receive the circumferential lip of the lip seal housing.

11. The pump of claim 6, wherein the first sealing element is a packing housing with at least one packing ring and the second sealing element is a packing follower.

12. The pump of claim 6, wherein the first sealing element is a sealing sleeve comprising a packing housing with at least one packing ring disposed therein, and the second sealing element is a packing follower fixable to the sealing sleeve via at least one fastener.

13. A bearing, comprising:
first and second opposing faces;
first and second bores in communication with the first and second opposing faces, the first and second bores configured to receive first and second shafts;

a first flat side surface and a second curved side surface, the second curved side surface having first and second curved portions associated with the first and second bores, respectively; and a plurality of grooves in the first and second opposing faces and the first flat side surface, the plurality of grooves configured to direct a flow of process fluid over the bearing during operation of the bearing.

14. The bearing of claim 13, wherein the first and second bores of at least one of the asymmetrical bearings further includes a lubrication groove.

15. The bearing of claim 14, wherein the lubrication groove is formed as a portion of a circle that is offset from a center of the respective bore by an offset distance, and at an angle "α" with respect to a line perpendicular to the bearing centerline.

16. The bearing of claim 14, at wherein the lubrication groove is offset by an angle "β" with respect to a line perpendicular to the second face of the bearing so that the lubrication groove runs from the second face to a distance "D" within the bore.

17. The bearing of claim 14, at wherein the lubrication groove is perpendicular to the second face of the bearing and runs from the second face to a distance "D" within the bore.

18. The bearing of claim 13, wherein the plurality grooves include first and second grooves disposed in the first opposing face and third and fourth grooves disposed in the second opposing face, the first and second grooves oriented at an oblique angle with respect to each other, and the third and further grooves oriented at an oblique angle with respect to each other.

19. The bearing of claim 18, wherein the first, second, third and fourth grooves intersect with a fifth groove in the first flat side surface.

20. The bearing of claim 13, wherein the plurality grooves include first and second grooves disposed in the first opposing face and third and fourth grooves disposed in the second opposing face, the first and second grooves oriented perpendicular to each other, and the third and further grooves oriented perpendicular to each other.

21. The bearing of claim 13, wherein the bearing has a "B" shape in profile.

* * * * *